United States Patent [19]
Hahn et al.

[11] Patent Number: 6,092,970
[45] Date of Patent: Jul. 25, 2000

[54] MANUALLY POSITIONED WHEEL CHOCKING APPARATUS

[75] Inventors: Norbert Hahn, Franklin; Scott L. Springer, Whitewater, both of Wis.

[73] Assignee: Rite-Hite Holding Corporation, Milwaukee, Wis.

[21] Appl. No.: 09/004,954

[22] Filed: Jan. 9, 1998

[51] Int. Cl.$^7$ ................................................ B60T 3/00
[52] U.S. Cl. ................... 414/401; 410/30; 188/32
[58] Field of Search ..................... 414/396, 401, 414/584; 14/71.1; 188/4 R, 32, 36; 410/7–12, 24, 26, 30

[56] References Cited

U.S. PATENT DOCUMENTS

| | | | |
|---|---|---|---|
| 1,102,773 | 7/1914 | Martin | 188/32 |
| 2,413,744 | 1/1947 | Carter | 280/179 |
| 2,773,564 | 12/1956 | Garard, Sr. | 188/32 |
| 3,110,466 | 11/1963 | O'Sullivan | 248/119 |
| 3,221,907 | 12/1965 | O'Sullivan | 410/30 X |
| 3,305,049 | 2/1967 | Willey | 188/32 |
| 3,447,639 | 6/1969 | Parr | 188/32 |
| 3,542,157 | 11/1970 | Noah | 188/32 |

(List continued on next page.)

FOREIGN PATENT DOCUMENTS

| | | | |
|---|---|---|---|
| 0 284 532 | 9/1988 | European Pat. Off. . | |
| 0284532 | 9/1988 | European Pat. Off. | 410/30 |
| 0 366 571 | 5/1990 | European Pat. Off. . | |
| 0 384 850 A1 | 8/1990 | European Pat. Off. . | |
| 0 442245 | 8/1991 | European Pat. Off. | 410/30 |
| 0 537 075 A1 | 4/1993 | European Pat. Off. . | |
| 0 639 488 A1 | 2/1995 | European Pat. Off. . | |
| 0 775 653 A1 | 5/1997 | European Pat. Off. . | |
| 1469877 | 1/1967 | France | 410/30 |
| 2 284 481 | 9/1974 | France . | |
| 2 394 423 | 2/1979 | France . | |
| 2 652 340 | 3/1991 | France . | |
| 2 672 578 | 8/1992 | France . | |
| 2 689 845 | 10/1993 | France . | |
| 2 736 336 | 7/1995 | France . | |
| 583 404 | 9/1933 | Germany . | |
| 27 35 826 | 2/1979 | Germany . | |
| 205852 | 1/1984 | Germany | 410/30 |
| 3 830 891 | 3/1990 | Germany . | |
| 41 19 480 A1 | 6/1991 | Germany . | |
| 41 20 035 A1 | 6/1991 | Germany . | |
| 41 19 480 A1 | 1/1993 | Germany . | |
| 4119480 | 1/1993 | Germany | 410/30 |
| 44 27 406 C1 | 8/1994 | Germany . | |
| 562008 | 5/1955 | Italy . | |
| 60-36230 | 2/1985 | Japan . | |
| 157253 | 7/1978 | Netherlands . | |
| 1036593 | 8/1983 | U.S.S.R. . | |
| 95/18029 | 7/1995 | WIPO . | |
| 97/02201 | 1/1997 | WIPO . | |
| 97/44220 | 11/1997 | WIPO . | |
| WO 97/49627 | 12/1997 | WIPO . | |

OTHER PUBLICATIONS

*L'Equipement De Vos Quais,* SITI, 22, rue Jules Guesde, 26800 Portes–Les–Valence, France.

Primary Examiner—Gregory A. Morse
Attorney, Agent, or Firm—Marshall, O'Toole, Gerstein, Murray & Borun

[57] ABSTRACT

Manually positioned wheel chocking apparatus are disclosed. In a preferred embodiment, the chocking apparatus includes a track secured adjacent a parking area; a movable chock; and fixing apparatus for temporarily fixing the chock to the track to substantially prevent the chock from moving. The movable chock has a surface which can be selectively positioned within the parking space at a location for engaging a tire of a vehicle. It also includes an extension for operatively engaging the track. The fixing apparatus may optionally comprise a pin sized to mate with a bore in a track or a frictional lock, preferably constructed as an over-center toggle.

36 Claims, 17 Drawing Sheets

U.S. PATENT DOCUMENTS

| | | | |
|---|---|---|---|
| 3,667,160 | 6/1972 | Salloum | 49/35 |
| 4,013,145 | 3/1977 | Mumm | 188/32 |
| 4,122,629 | 10/1978 | Rennick | 49/357 |
| 4,207,019 | 6/1980 | Cone | 414/373 |
| 4,216,724 | 8/1980 | Grillet | 104/258 |
| 4,572,080 | 2/1986 | Williams et al. | 104/252 |
| 4,653,967 | 3/1987 | Isaksson et al. | 410/49 |
| 4,674,929 | 6/1987 | Blunder | 188/36 X |
| 4,676,344 | 6/1987 | Locicero | 188/32 |
| 4,679,974 | 7/1987 | Blunder | 410/30 |
| 4,854,790 | 8/1989 | Andre | 410/30 |
| 4,969,792 | 11/1990 | Ellis et al. | 414/401 |
| 4,979,856 | 12/1990 | Blunder et al. | 410/30 X |
| 5,037,255 | 8/1991 | Bullock et al. | 410/30 |
| 5,096,021 | 3/1992 | Tart | 188/32 |
| 5,249,905 | 10/1993 | Warner et al. | 414/401 |
| 5,302,063 | 4/1994 | Winsor | 188/32 X |
| 5,375,965 | 12/1994 | Springer et al. | 414/786 |
| 5,464,076 | 11/1995 | Benedetto, Jr. | 410/30 X |
| 5,531,557 | 7/1996 | Springer | 414/401 |
| 5,582,498 | 12/1996 | Springer et al. | 414/401 |
| 5,655,631 | 8/1997 | Richardson | 188/32 |
| 5,685,397 | 11/1997 | Maddox et al. | 188/36 |
| 5,689,981 | 11/1997 | DeLuca et al. | 70/226 |
| 5,692,402 | 12/1997 | Clements | 70/234 |
| 5,709,518 | 1/1998 | Alexander et al. | 414/401 |
| 5,711,110 | 1/1998 | Williams | 49/35 |
| 5,743,697 | 4/1998 | Alexander | 414/401 |
| 5,896,957 | 4/1999 | Berends et al. | 414/401 X |
| 5,908,274 | 6/1999 | Silberman | 410/30 X |

6,092,970

MANUALLY POSITIONED WHEEL CHOCKING APPARATUS

FIELD OF THE INVENTION

The invention relates generally to vehicle restraints and, more particularly, to manually positioned chocking apparatus for restraining a vehicle in a parking space or the like.

BACKGROUND OF THE INVENTION

The need to restrain vehicles in certain instances has long been known. For example, it has long been known that certain safety benefits can be achieved by securing a truck adjacent a loading dock during loading or unloading of that vehicle. If the vehicle were not restrained, and the truck operator were to prematurely drive away from the loading dock, loading dock personnel or equipment could be trapped on the truck and/or injured, particularly if a person was exiting or entering the truck when the vehicle pulled away from the dock.

Many solutions to this problem have been proposed. For example, motorized vehicle restraints which hook to the ICC bar of a trailer parked adjacent to a loading dock such as those sold by Rite-Hite Corp. and as disclosed in U.S. Pat. No. 4,264,259 have been very effective in addressing this problem. As another example, various forms of wheel chocks have been utilized to restrain vehicles.

Some known wheel chocks are designed for mounting beneath the surface of the parking area adjacent to the dock. Such chocks typically include a trigger located above the surface of the parking area. When a wheel contacts the trigger, the chock portion of the device rises out of the ground to form a projection in front of the truck tire.

Other prior art wheel chocks comprise chocks which either store flat or below the driveway grade, and rise up to form a projection in front of the tire. However, such chocks suffer from the disadvantage of requiring excavation of the parking area if the chock is being added to a pre-existing dock area. Some prior art chocks of the this type have also been disadvantageous in that they tend to run high relative to the trailer frame. In other words, when the chock moves out of the lowered positioned towards the chocked position, some chocks immediately rise to their full height and then run towards the tire thereby creating the risk of contact between the chock and vehicle parts or items suspended beneath the truck.

Some prior art chocks are disadvantageous in that they involve complex mechanical structures. Such structures render these chocks costly to purchase and costly to maintain. Other automatic prior art chocks have been disadvantageous in that they strike the wheel too low to adequately prevent movement of the vehicle. Traditional portable chocks also suffer from the same deficiency—i.e. striking the wheel too low—and may also be disadvantageous as nothing holds the chock in place along the driveway, and they are thus subject to sliding over the driveway surface.

SUMMARY OF THE INVENTION

In accordance with an aspect of the invention, an apparatus for securing a vehicle in a parking space adjacent a loading dock is provided. The apparatus comprises a track secured adjacent the loading dock, for example, secured to the driveway adjacent the parking space and having a longitudinal axis. The apparatus also includes a dolly cooperating with the track for movement along the longitudinal axis and a chock. The chock includes a base operatively engaging the dolly for sliding movement in a direction substantially transverse to the longitudinal axis of the track. The chock is thus movable from a storage position such as where the chock is located substantially above the track, to a chocking position wherein the chock is at least partially located in front of a tire of the vehicle to be secured. In addition, the apparatus includes means for securing the dolly relative to the track when the chock is in a chocking position.

In a preferred embodiment, the dolly includes wheels to facilitate movement along the track and/or a handle to facilitate movement. Preferably, the dolly defines a channel for slidably receiving the base of the chock.

In any of the foregoing embodiments, the chock may include a handle to facilitate movement of the chock relative to the dolly, and/or a flange for locating the chock relative to the dolly in the storage position.

In some embodiments, the dolly includes a first stop, the chock includes a second stop, and the first and second stops cooperate to locate the chock relative to the dolly in the second position.

In any of the foregoing embodiments, the track may include a plurality of bores, the dolly may include a bore, and the securing means may comprise a pin sized for simultaneous insertion into the bore of the dolly and one of the bores of the track.

In any of the foregoing embodiments, the securing means may be implemented as a frictional lock.

In accordance with another aspect of the invention, a chocking apparatus for securing a vehicle in a parking space adjacent a loading dock is provided. The chocking apparatus includes a track secured adjacent the loading dock, (for example, secured to the driveway adjacent the parking space); and a movable chock including a surface for selective positioning within the parking space at a location for engaging a tire of the vehicle. The movable chock further includes an extension for selective positioning adjacent the parking space in operative engagement with the track. The extension has at least one pin sized to engage one of a plurality of bores in the track to substantially prevent the chock from moving in at least one direction relative to the track.

Preferably, the track and the extension of the chock have complementary shapes.

In some embodiments, the chocking apparatus includes at least two pins, and the at least two pins have lengths such that the chock can only separate from the track when lifted in a substantially vertical direction.

In any of the foregoing embodiments, the pin may be mounted on the extension and/or may be spring biased downward.

In any of the foregoing embodiments, the at least one pin may comprise a plurality of longitudinally spaced pins and the track may define a plurality of longitudinally spaced bores, wherein the longitudinal spacing between the pins is different from the longitudinal spacing between the bores.

In accordance with another aspect of the invention, a chocking apparatus for securing a vehicle in a parking space adjacent a loading dock is provided. The chocking apparatus includes a track secured adjacent the loading dock, for example, secured to the driveway adjacent the parking space; and a movable chock including a surface for selective positioning within the parking space at a location for engaging a tire of the vehicle. The movable chock further includes an extension for selective positioning adjacent the parking space in operative engagement with the track. The apparatus is further provided with means for temporarily fixing the chock to the track to substantially prevent the chock from moving in at least one direction relative to the track.

In some embodiments, the temporary fixing means comprises at least one pin sized to mate with bores defined in the track and the extension.

In some embodiments, the temporary fixing means comprises at least one pin sized to mate with a bore defined in the track, and the at least one pin is mounted on the extension and spring biased downward.

In some embodiments, the track includes a plurality of longitudinally spaced teeth, and the temporary fixing means comprises at least one pin disposed in a substantially horizontal position for selectively mating with the teeth of the track.

In accordance with another aspect of the invention, an apparatus for securing a vehicle in a parking space adjacent a loading dock is provided. The apparatus includes a track secured adjacent the loading dock, for example, secured to the driveway adjacent the parking space. The track has first and second sides and a longitudinal axis. The apparatus also includes a trolley located for reciprocating movement along the longitudinal axis of the track; and, means for selectively securing the trolley relative to the track. The apparatus is also provided with a support arm pivotally attached to the trolley; and, a chock coupled to the support arm such that the support arm can be pivoted to switch the chock from the first side to the second side of the track to position the chock adjacent a tire of the vehicle in the parking space.

In some embodiments, the securing means comprises a pin adapted for simultaneous insertion into a bore defined in the trolley and a bore defined in the track.

In some embodiments, the securing means comprises a frictional lock.

In some embodiments, the track comprises an I-beam, and the trolley comprises a platform supported on a top section of the I-beam and rollers suspended from the platform in a substantially horizontal plane. In some such embodiments, the rollers comprise at least two rollers which engage opposite sides of a substantially vertical section of the I-beam.

In some embodiments, the trolley comprises a C-shaped rail cooperating with a substantially horizontal section of the I-beam. In some such embodiments, the trolley comprises first and second wheels mounted for cooperation with a substantially vertical section of the I-beam. In such embodiments, the wheels may be mounted within a cavity defined by the C-shaped rail, and the wheels may be supported on lower extensions of the C-shaped rail.

In some embodiments, the trolley comprises a platform located above a substantially horizontal section of the I-beam, and a flange located beneath the substantially horizontal section of the track. In such embodiments, the securing means may optionally comprise a frictional lock. In such embodiments, the frictional lock preferably comprises first and second levers pivotally secured to the platform. The first and second levers are pivotally secured to each other at a point different than the points at which the levers are secured to the platform such that they form an over-center toggle lock. Optionally, the second lever includes an extension located such that, pivoting the first lever relative to the second lever causes the extension of the second lever and the flange of the trolley to frictionally engage the track. Preferably, the extension of the second lever and the flange of the trolley frictionally engage opposite sides of a substantially vertical section of the I-beam.

In accordance with still another aspect of the invention, a chocking apparatus for securing a vehicle in a parking space adjacent a loading dock is provided. The apparatus includes a track secured adjacent the loading dock, for example, secured to the driveway adjacent the parking space. The track defines a recess. The apparatus also includes a movable chock including a surface for selective positioning within the parking space at a location for engaging a tire of the vehicle. The movable chock further includes an extension for selective positioning at least partially within the recess. In addition, the apparatus is provided with a frictional lock for securing the extension of the chock to the track to substantially prevent the chock from moving relative to the track.

Preferably, the frictional lock comprises first and second levers; the first and second levers are pivotally coupled to the chock and to each other; and, the second lever includes a projection such that, when the first lever is pivoted relative to the second lever, the projection of the second lever and the extension of the chock frictionally engage opposite sides of the track.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
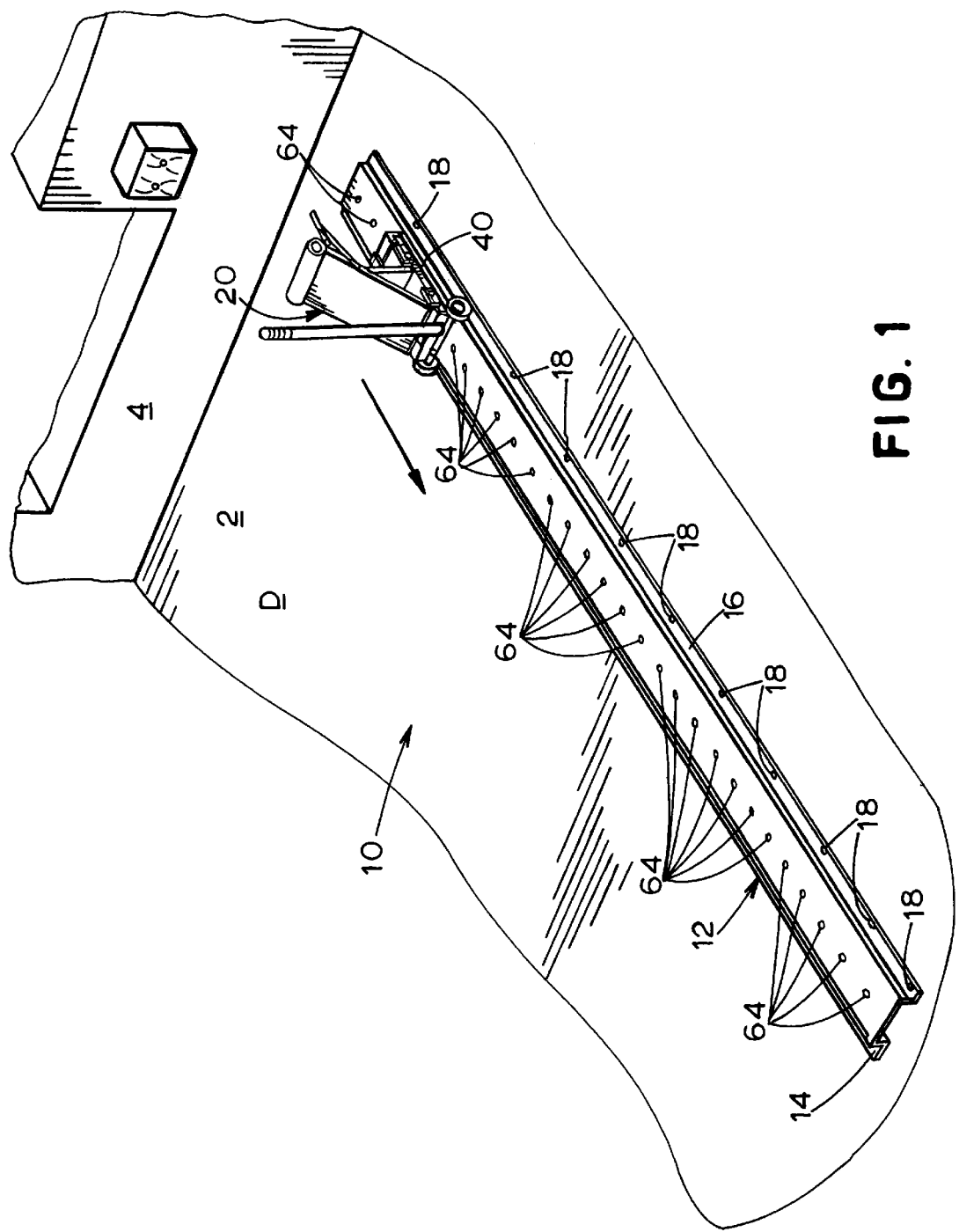
FIG. 1 is a right, front perspective view of a manually positioned wheel chocking apparatus constructed in accordance with the teachings of the invention.

A manually positioned wheel chocking apparatus 10 constructed in accordance with the teachings of the invention is illustrated in FIG. 1. Although the wheel chocking apparatus 10 is shown being used on the driveway D adjacent a parking area 2 in front of a loading dock 4 on a warehouse or the like, persons of ordinary skill in the art will readily appreciate that the teachings of the invention are not limited to any particular environment of use. On the contrary, the teachings of the invention are applicable to any environment where restraining a vehicle is useful or desired.

For the purpose of securing the chocking apparatus 10 in a predefined position, the apparatus 10 is provided with a rectangular, raised track 12. As shown in FIG. 1, the track 12 is secured adjacent the loading dock. In this representative example, this is achieved by securing the track to the driveway D adjacent and parallel to a parking area 2. While securing to the driveway is preferred, the track could also be secured to the dock itself, to an adjacent wall or to any other stationary, adjacent structure. As used herein, the term "driveway" means the surface over which the vehicle travels as it approaches the dock, and the surface on which the vehicle will be parked. It will be appreciated by one of skill in the art that while the "driveway" may be cement or other pavement, it may also be, for example, the upper surface of a truck-leveler or any other surface or structure adjacent a loading dock or like facility. The track 12 is preferably elongated with its longitudinal axis positioned substantially parallel to the parking area 2 and substantially perpendicular to the loading dock 4 although other orientations are possible and even preferable in given applications. As illustrated in FIG. 1, the track 12 preferably includes flanges 14, 16 on both of its sides. Conventional fasteners 18 such as bolts or the like pass through bores 17 (see FIG. 2) defined in these flanges 14, 16 and into the driveway to fix the track 12 to the driveway. Preferably, the bores are countersunk such that the heads of the fasteners 18 lie below the surface of the flanges 14, 16. While this exemplary embodiment shows the track mounted on the upper surface of the driveway, other mounting methods are possible, such as mounting some or all of the track in the driveway.

To chock the wheel of a vehicle parked or otherwise located in the parking area 2, the apparatus 10 is provided with a chock 20. As most easily seen in FIG. 3, the chock 20 is provided with a base 22 (implemented in FIG. 1 as a substantially horizontal platform) and an angled plate or chocking arm 26 welded to, and supported upon, a substantially vertical plate 28. However, persons of ordinary skill in the art will readily appreciate that the chock 20 could be implemented in other ways without departing from the scope or spirit of the invention. By way of example, not limitation, the chock 20 could be implemented as a unitary member such as a block with a triangular cross-section.

In the illustrated embodiment, a cylindrical contact 30 is mounted to the upper end of the angled plate 26. The cylindrical contact 30 provides a surface free of sharp edges for contacting a tire thereby preventing puncture thereof (see FIG. 5).

Figure 2:
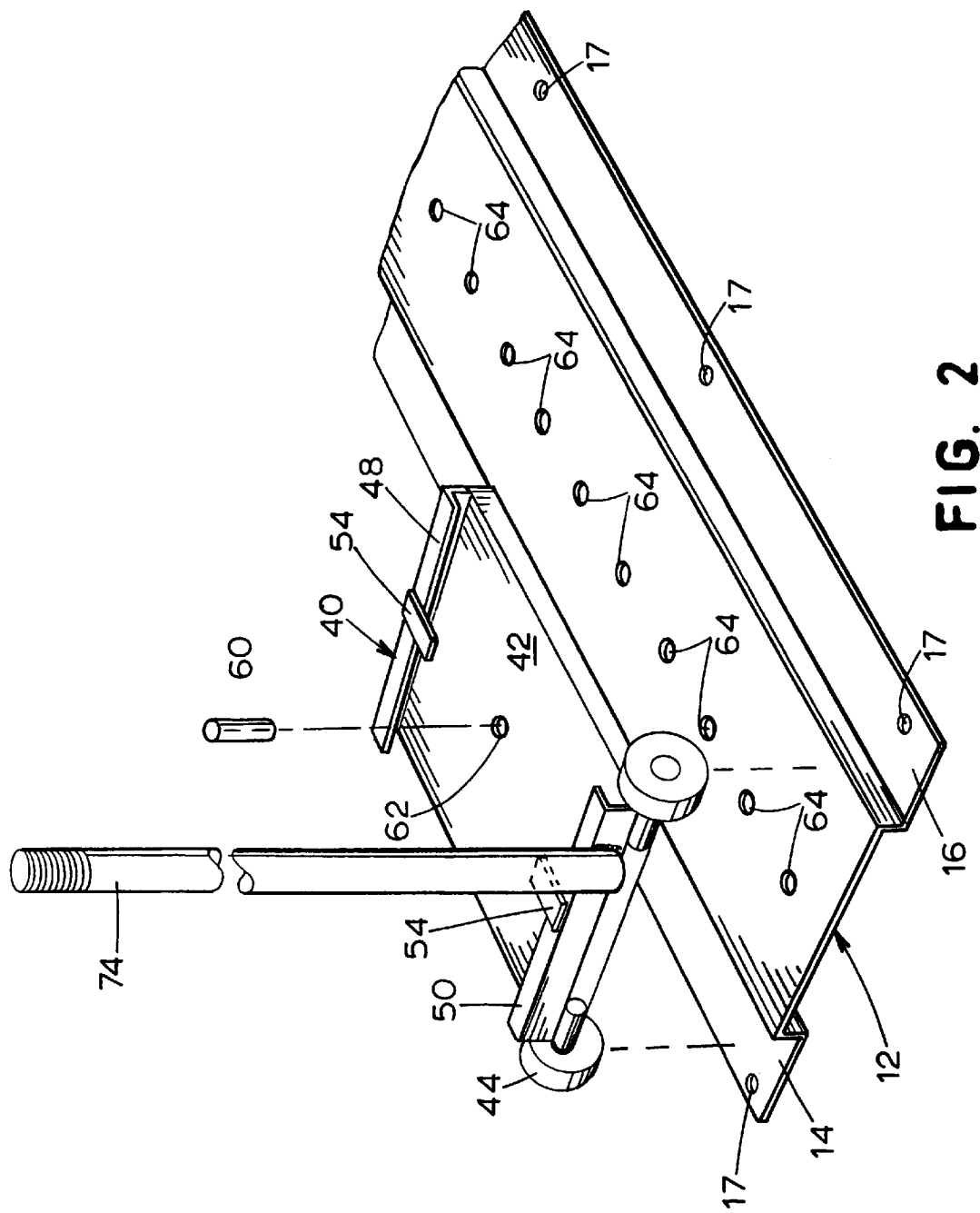
FIG. 2 is a right, front perspective view of the dolly of the wheel chocking apparatus of FIG. 1.
Figure 4:
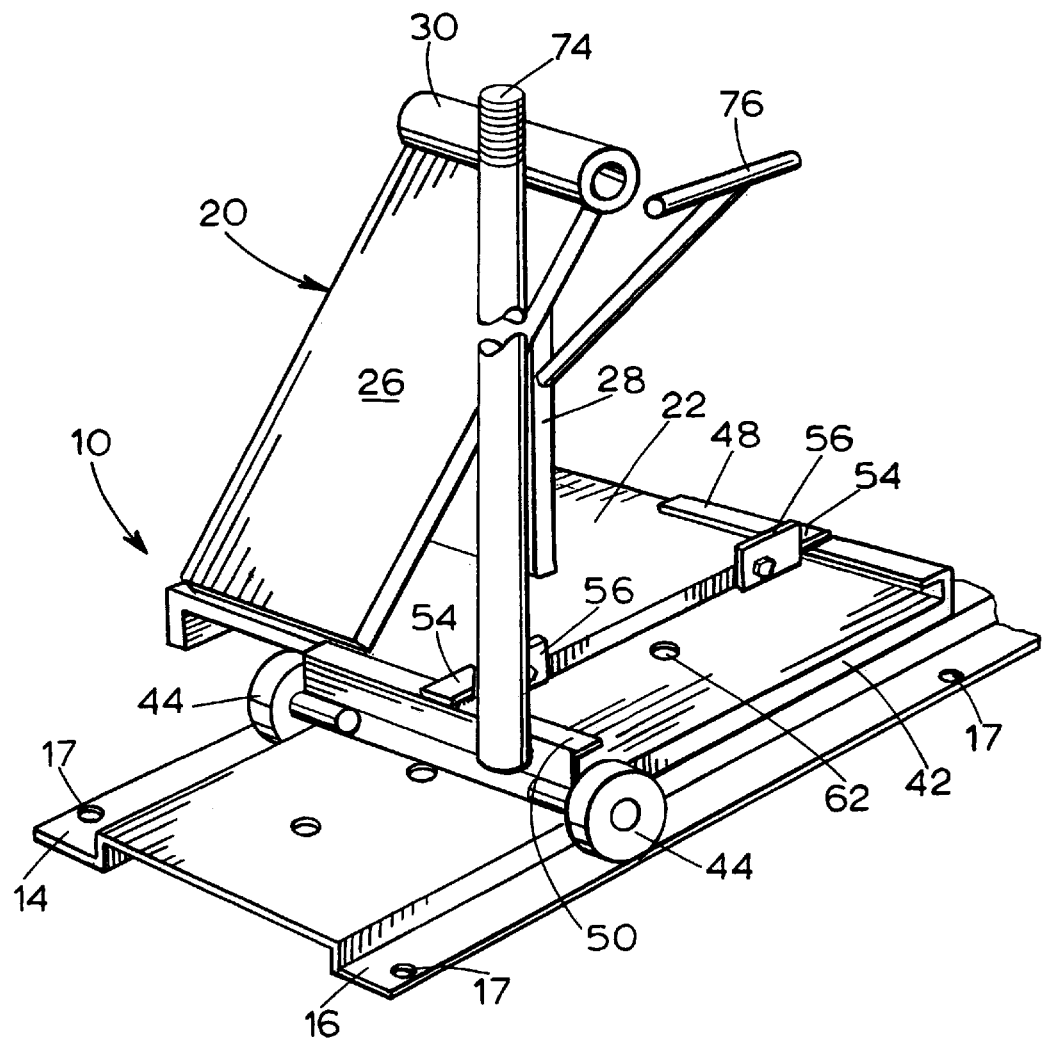
FIG. 4 is a perspective view of the chocking apparatus of FIG. 1 shown in the chocked position.

To facilitate moving the chock 20 along the longitudinal axis of the track 12 so as to locate the chock 20 at a position appropriate to chock a tire, the apparatus 10 is provided with a dolly 40. The dolly 40 preferably includes a base 42 adapted for sliding movement along the top surface of the track 12. The base 42 carries a pair of wheels 44 at its distal end to facilitate movement along the track 12. As shown in FIGS. 2 and 4, the wheels 44 are preferably located to ride along the top of the flanges 14, 16 of the track 12. As mentioned above, countersinking the fasteners 18 in the bores 17 of the flanges 14, 16 is one way to prevent interference between the wheels 44 and the fasteners 18 as the dolly 40 moves along the track 12.

As most easily seen in FIG. 2, the dolly 40 is preferably provided with end plates 48, 50 respectively located at the distal and proximal ends of the base 42. As shown in FIG. 2, the end plates 48, 50 are formed as L-shaped brackets which cooperate with the base 42 to respectively define channels at the distal and proximal ends of the dolly 40.

As shown in FIG. 4, the base 22 of the chock 20 is dimensioned to slidably fit on the base 42 of the dolly 40 such that the proximal and distal ends of the base 22 are located within the channels defined by the L-shaped brackets 48, 50. The brackets 48, 50 ensure that the chock 20 cannot move vertically with respect to the dolly 40. However, the chock 20 is slidably movable with respect to the dolly 40 in a direction substantially transverse to the longitudinal axis of the track 12. More specifically, the chock 20 is movable from a storage position to a chocking position. In the storage position, the chock is out of the pathway that the tire or wheel would travel as it moves toward or away from the dock. Thus, in the storage position, the chock neither impedes ingress or egress to the dock. In the illustrated embodiment, the storage position of the chock is a position wherein the chock 20 is located substantially above the dolly 40 and the track 12 (see FIG. 1). However, other storage positions, such as on the opposite side of the track from the tire path, are possible. In the chocking position, on the other hand, the chock 20 is located at least partially in front of a tire of a vehicle to be secured (see FIG. 4).

Figure 3:
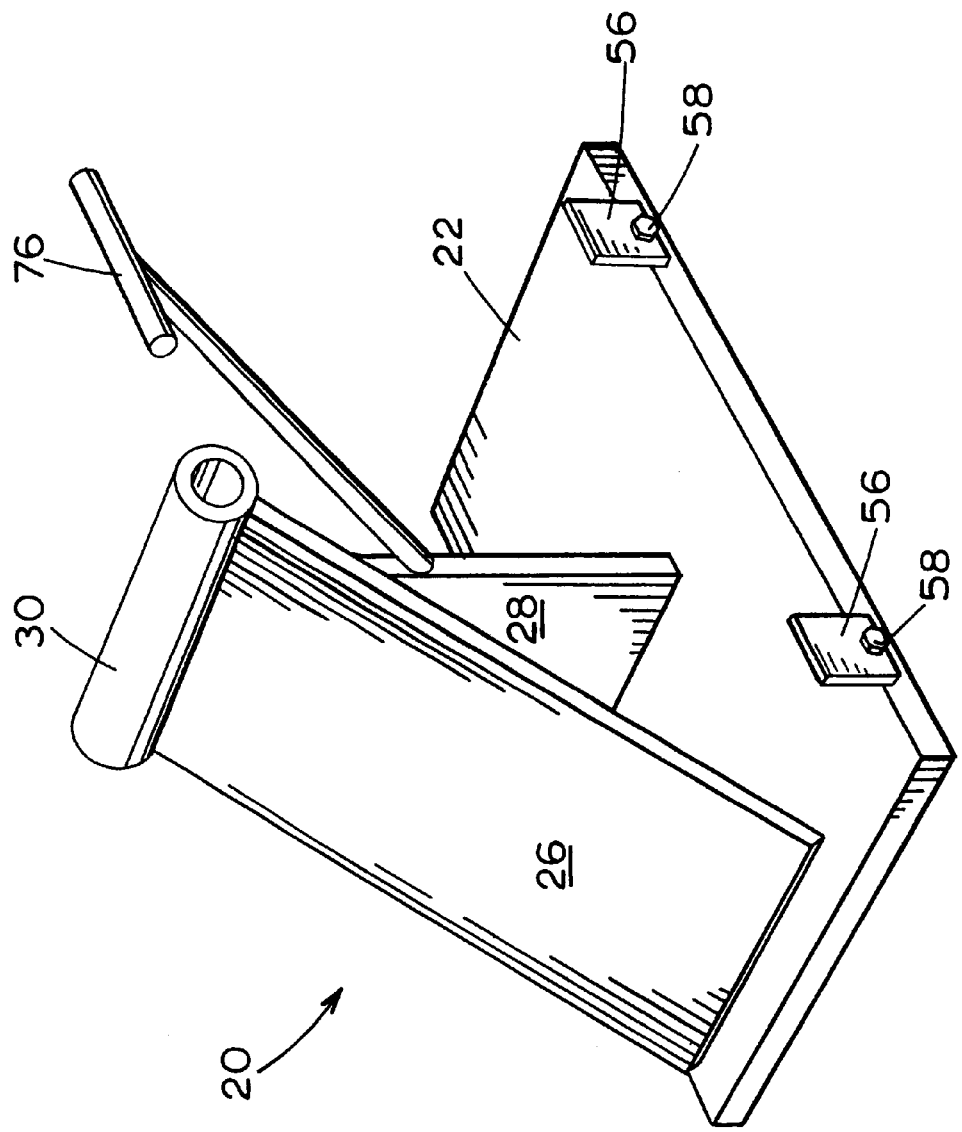
FIG. 3 is a right, front perspective view of the chock of the wheel chocking apparatus of FIG. 1.

In order to limit the transverse movement of the chock 20 in a first direction, and to thereby define the chocking position, the dolly 40 and the chock 20 are respectively provided with stops 54, 56. As shown in FIG. 2, the stops 54 of the dolly 40 are welded upon the L-shaped brackets 48, 50 in a substantially horizontal plane. As illustrated in FIG. 3, the stops 56 of the chock 20 are mounted to a side of the base 22 with fasteners 58 such as bolts or the like. The stops 56 are mounted in a substantially vertical plane such that, when a user slides the chock 20 from the storage position towards the chocking position, the stops 56 of the chock 20 abut the stops 54 of the dolly 40 when the chock 20 reaches the chocking position (see FIG. 4). Preferably, the stops 54 are located such that a portion of the chock 20 remains above the dolly 40 when the chock 20 is in the chocking position (see FIG. 4). This overlap ensures a strong connection between the chock 20 and the dolly 40.

Figure 5:
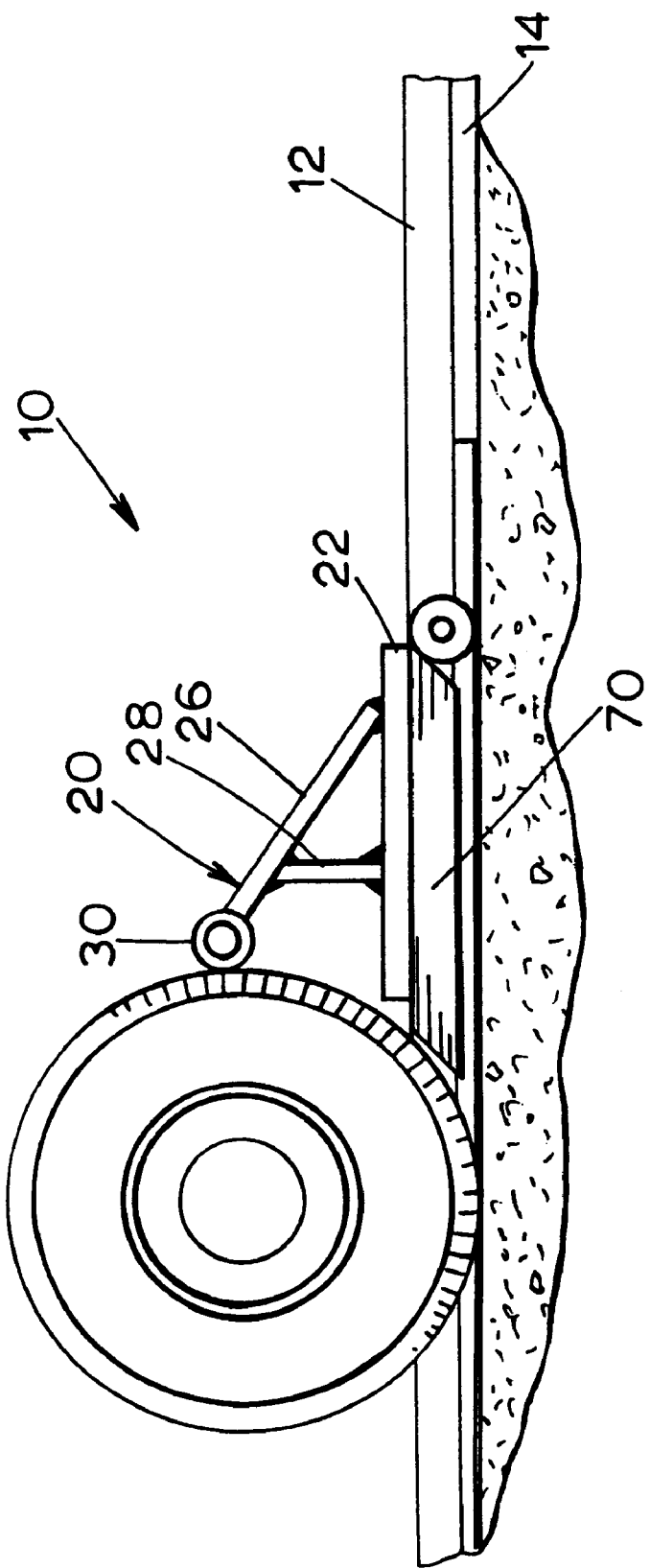
FIG. 5 is a side view of the apparatus of FIG. 1 shown chocking a tire.

To limit the transverse movement of the chock 20 with respect to the dolly 40 in a second direction, and to thereby define the storage position, the chock 20 is provided with a flange 70. As shown in FIGS. 3, 4 and 5, the flange 70 is preferably suspended from the base 22 of the chock 20 along a side thereof. When a user moves the chock 20 from the chocking position (see FIG. 4) toward the storage position, the base 22 of the chock 20 slides relative to the base 42 of the dolly 40 until the flange 70 abuts the side of the base 42 of the dolly 40. The flange 70 thus assists in locating the chock 20 in the storage position.

As shown in FIG. 5, the flange 70 preferably extends from the base 22 of the chock 20 to a position adjacent to but spaced from the driveway so as to clear the thickness of the flange 14. Thus, if a wheel applies force to the chock 20, the flange 70 will abut the driveway after only a short travel thereby enhancing the stability of the chock 20 and reducing rocking movements thereof.

In order to prevent movement of the dolly 40 (and, thus, the chock 20) when the chock is in the chocking position, the apparatus is provided with means for temporarily manually securing the dolly 40 to the track 12. In the embodiment illustrated in FIGS. 1–5, the securing means is implemented by a pin 60 (see FIG. 2) sized to simultaneously mate with a bore 62 (see FIG. 4) defined in the base 42 of the dolly 40 and a bore 64 defined in the track 12. As shown in FIG. 1, the track 12 preferably includes a plurality of bores 64 to enable the dolly 40 to be fixed in many different positions relative to the track 12 to thereby accommodate different vehicles with different wheel sizes and/or different wheel locations with respect to the dock 4.

To facilitate manual positioning of the chocking apparatus 10, the dolly 40 is provided with a handle 74 (see FIGS. 2 and 4) and the chock 20 is provided with a handle 76 (see FIGS. 3 and 4). The dolly handle 74 facilitates movement of the dolly 40/chock 20 along the longitudinal axis of the track 12. The handle 76 of the chock 20 facilitates movement of the chock 20 between the storage and chocking positions.

In use, after a vehicle has parked in the parking area, a user moves the dolly 40/chock 20 along the track 12 via the handle 74 until the dolly 40/chock 20 is located adjacent and distal to the wheel to be chocked. Preferably, and according to this embodiment, this may be done by tipping the dolly 40 up on the wheels 44, and rolling the dolly along the track. After a position along the longitudinal axis of the track is selected the dolly may be tipped back down, and the user utilizes the handle 76 to slide the chock 20 from the storage position to the chocking position such that the chock 20 is located in front of the wheel to be chocked. In the illustrated embodiment, the pin 60 is then inserted into the bore 62 of the dolly 40 and into one of the bores 64 of the track to fix the dolly 40/chock 20 to the track 12. To ensure that chock 20 is located close to the wheel in the secured chocked position (e.g., to avoid providing a substantial running start by the wheel at the chock 20), the bores 64 are preferably closely spaced relative to the diameter of the pin. It should be noted that pin 60 can also be permanently affixed to the underside of base 42 which then provides automatic insertion of pin 60 into track 12 when dolly 40 is positioned from a tilted/rolling position to an upright position.

Although the chocking apparatus 10 illustrated in FIGS. 1–5 employs a dolly 40 with only one pair of wheels, persons of ordinary skill in the art will readily appreciate that one or more additional sets of wheels could be added (or all wheels eliminated) without departing from the scope of the invention. By way of example, not limitation, a second set of wheels could be located at the proximal end of the dolly 40 to reduce friction between the dolly 40 and the track 12.

Furthermore, although in the embodiment illustrated in FIGS. 1–5, the securing means was implemented as a pin and bore arrangement, persons of ordinary skill in the art will readily appreciate that other means can be implemented in this role without departing from the scope or spirit of the invention. By way of example, not limitation, the securing means could be implemented as a frictional lock (such as, for example, those discussed below), as a spring loaded pin in various orientations, and/or as multiple pins without departing from the scope or spirit of the invention.

Moreover, although the apparatus 10 illustrated in FIGS. 1–5 employs only one track 12 and only one dolly 40/chock 20, persons of ordinary skill in the art will readily appreciate that other arrangements could be employed without departing from the scope or spirit of the invention. By way of example, not limitation, a second track 12 with a second dolly 40/chock 20 could be added to the opposite side of the parking area, and/or one or more additional dolly(s)/chock (s) could be added to the track(s) to enable chocking of multiple tires on the same or opposite sides of the vehicle without departing from the teachings of the invention.

Figure 6:
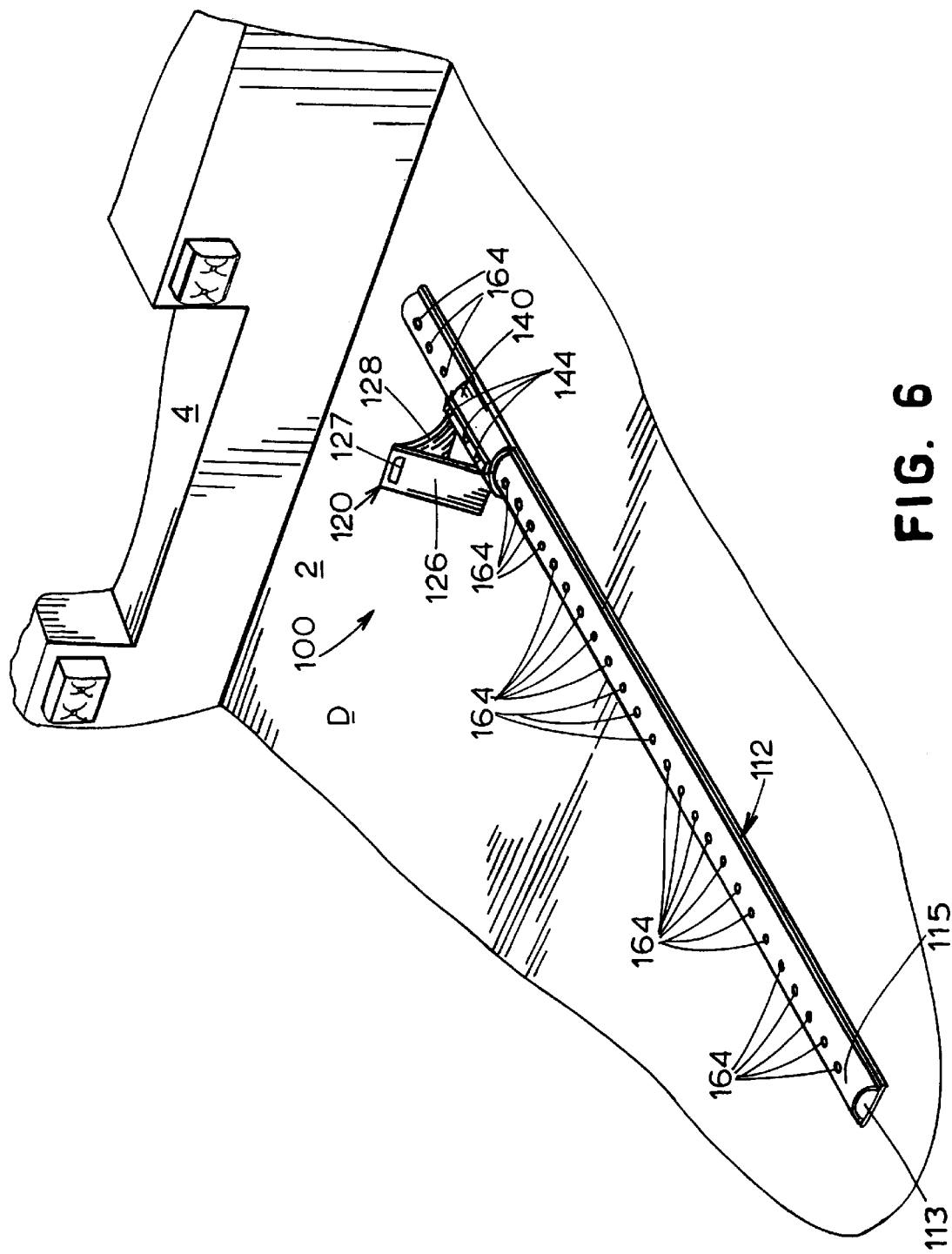
FIG. 6 is a right, front perspective view of a second wheel chocking apparatus constructed in accordance with the teachings of the invention.

Another manually positioned wheel chocking apparatus 100 constructed in accordance with the teachings of the invention is shown in FIG. 6. As with the apparatus 10 discussed above, although the chocking apparatus 100 is illustrated for use adjacent a parking area 2 in front of a loading dock 4, the apparatus 100 is not limited to use in any particular environment.

Also like the apparatus 10 discussed above, the wheel chocking apparatus 100 shown in FIG. 6 includes an elongated track 112. The elongated track 112 of FIG. 6, however, includes a base 113 and a crown 115 welded together (see FIG. 7). The base 113 is preferably secured adjacent the loading dock by securement to the driveway adjacent the parking area 2 via fasteners 118 such as bolts or the like (see FIG. 7). Like the previous embodiment, however, other securement means, positions, and orientations for the track 112 are possible.

Like the apparatus 10 of FIGS. 1–5, the chocking apparatus 100 of FIG. 6 includes a plurality of bores 164. The bores 164 are defined in the crown 115 and are spaced apart along the longitudinal axis of the track 112.

Figure 7:
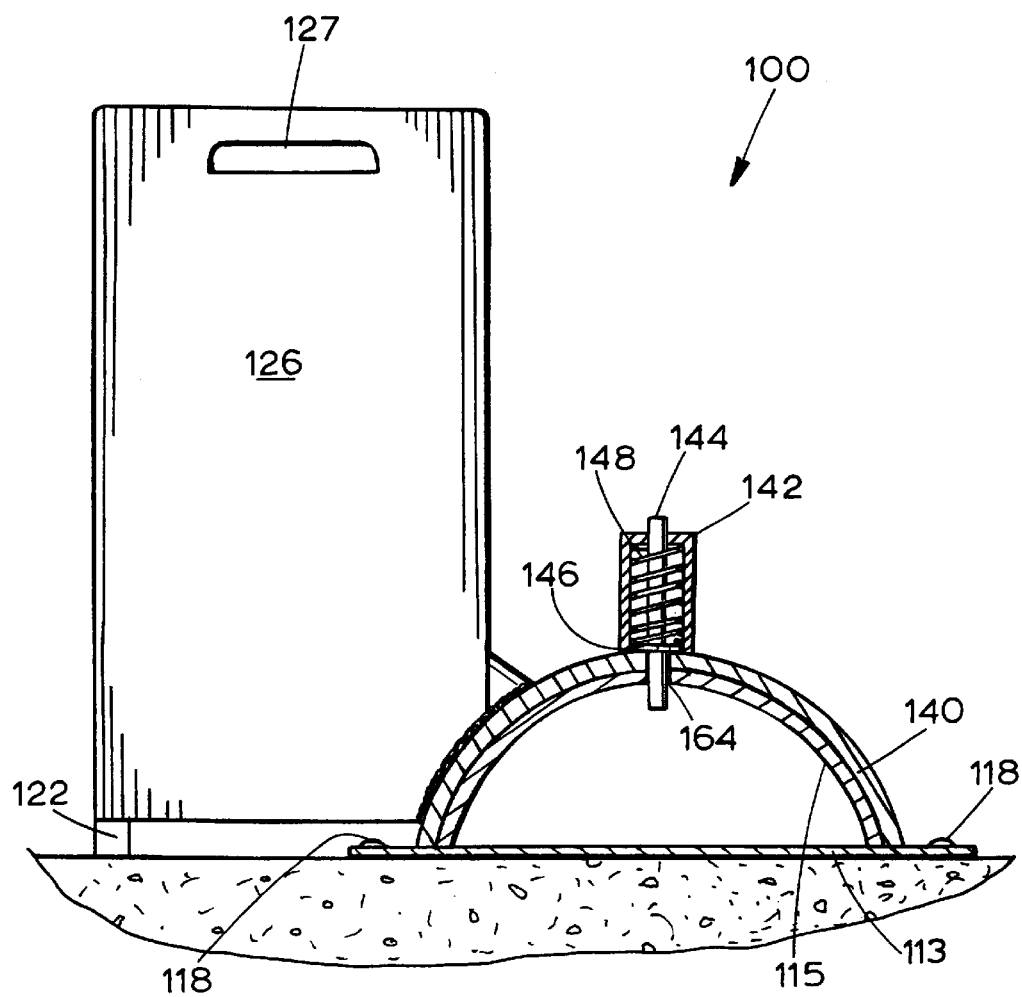
FIG. 7 is a partial cross-sectional view of the chocking apparatus of FIG. 6.

In order to chock a wheel of a vehicle parked in the parking area 2, the apparatus 100 is provided with a manually movable chock 120. The movable chock 120 can be selectively positioned within the parking space at a location for engaging a wheel or tire of the vehicle to be secured. As shown in FIGS. 6–7, the movable chock 120 includes a base 122, a chocking arm 126, and a support plate 128. The distal end of the chocking arm 126 is mounted to the base 122 and the proximal end of the chocking arm 126 is supported by the support plate 128 such that chocking arm 126 is positioned at an angle to the horizontal. The support plate 128 may be flat, but in the illustrated embodiment includes a curved (semi-circular) surface.

As shown in FIGS. 6 and 7, the chock 120 preferably includes an integral handle 127 to facilitate movement thereof. In use, the chock 120 can be lifted by the handle 127 and moved to a desired location.

Figure 17:
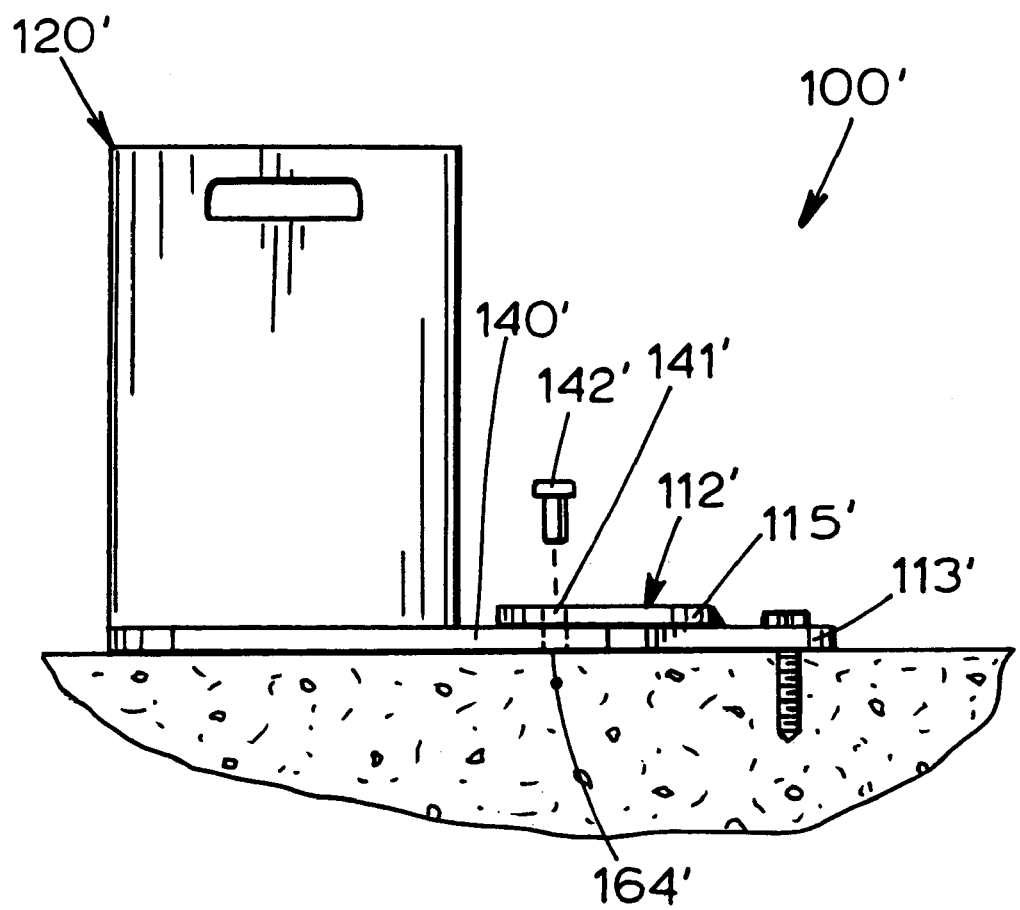
FIG. 17 is a partial, cross-sectional view of an alternative chocking apparatus constructed in accordance with the teaching of the invention.

For the purpose of securing the chock 120 to the track 112, the chock 120 is provided with an extension 140. As shown in FIG. 7, the shape of the extension 140 is preferably complementary to the shape of the track 112 such that the extension 140 can be positioned in overlying engagement with the track 112. Although in the illustrated embodiment, the cross-sections of the crown 115 of the track 112 and the extension 140 are semi-circular, persons of ordinary skill in the art will readily appreciate that other shapes could be employed without departing from the scope of the invention. By way of example, not limitation, the extension 140 and track 112 could have triangular shapes. A further alternative is illustrated in FIG. 17, which shows a related chocking apparatus 100'. As the structure of the FIG. 17 embodiment is substantially similar to that of FIGS. 6 and 7, the same reference numerals, but including a prime (') will be used in reference thereto. In that embodiment, the track 112' is implemented by use of two plates 113' and 115', with plate 115' having a plurality of bores 164'.

Returning to FIGS. 6 and 7, the apparatus 100 is provided with means for temporarily manually fixing the chock to the track to substantially prevent the chock from moving in at least one direction relative to the track. In the embodiment illustrated in FIGS. 6 and 7, the securing means is implemented by a plurality of pins 144. As shown in FIGS. 6–7, the extension 140 preferably includes a chamber 142 housing the plurality of pins 144. As most clearly shown in FIG. 7, each of the pins 144 preferably has a length sufficient to extend through a bore defined in the extension 140 and one of the bores 164 of the track 112. When one or more of the pins 144 mate with one or more of the bores 164, the chock 120 is prevented from moving relative to the track 142. If only one pin 144 mates with a bore 164, the chock 120 is prevented from rotating thereabout by the engagement of the extension 140 and track 112. Preferably, the lengths of the pins are selected such that, once a pin 144 engages a bore 164, the chock 120 can only be separated from the track 112 by lifting the chock 120 in a substantially vertical direction.

As illustrated in FIG. 7, the pins 144 are preferably provided with a circular stop 146. The circular stop 146 limits the downward movement of the pins 144, thereby ensuring the pins remain within the chamber 142. In addition, each of the pins 144 is preferably biased downward by a spring 148. Each of the springs 148 is located for compression between the top of the chamber 142 and the circular stop 146 of an associated pin 144 as shown in FIG. 7. Thus, if a user positions the chock 120 on the track 112 at a location where no pin 144 is aligned with a bore 164, springs 148 will be compressed. If the user slides the chock 120 longitudinally along the track 112, at least one pin 144 will eventually become aligned with a bore 164, at which point the force generated by spring(s) 148 and the force of gravity will cause the aligned pin(s) 144 to enter the bore(s) 164.

In the preferred embodiment, the longitudinal spacing between the pins 144 is different than the longitudinal spacing between the bores 164. Employing different spacing in this manner ensures that the chock can be secured to the track 112 in a wider variety of locations than would be possible were the spacing between the bores 164 and the spacing between the pins 144 identical.

To provide a visual indication that the chock 120 is secured to the track, the lengths of the pins 144 are preferably selected such that their upper ends extend out of bores defined in the top of the chamber 142 (see FIG. 7) when the pins 144 are not mated with a bore 164. When a pin 144 falls into a bore 164, the upper portion of the pin 144 withdraws (at least partially) into the chamber 142 thereby providing a clear visual indication that the chock 120 is secured.

In use, the movable chock 120 is first removed from the track 112. (Alternatively, the position of the chock 120 is reversed from that shown in FIG. 6 such that the chock 120 is not within the parking area 2 and the extension 140 mates with the track 112.) A vehicle is then positioned within the parking area 2. Once the vehicle is stopped at a position where chocking is desired, the user carries the chock 120 (preferably, via the handle 127) to a location in front of the wheel to be chocked. The chock 120 is then lowered to the driveway with the extension 140 overlying the track 112. If none of the pins 144 immediately align with a bore 164, the chock 120 is slid longitudinally along the track 112 until at least one pin 144 mates with a bore of the track 112.

When chocking is no longer desired, the chock 120 is simply lifted off of the track 112 and moved out of the path of the wheels of the vehicle.

One of skill in the art will appreciate that some minimal spacing will be required between chocking assembly 120 and the tire or wheel being chocked, so that the assembly can be lowered into a chocking position, and lifted therefrom.

In the embodiment of FIG. 17, the securing means is implemented by extension 140' which includes at least one bore 141' for receiving a pin 142' to secure the chock 120' along the track 112'. The embodiment of FIG. 17 has an added benefit compared to that of FIGS. 6 and 7 in that stability may be enhanced by virtue of the fact that the extension is sandwiched between the plate 115' and the driveway. However, one of skill in the art will appreciate that the chock 120' cannot be inserted and removed vertically, but rather must be rotated or pivoted into and out of a chocking position. Once the chock 120' is in a chocking position, the pin 142' may be dropped in place to secure the chock 120' to the track 112'.

Although in the embodiment illustrated in FIGS. 6–7, the securing means is implemented by spring biased, substantially vertically oriented pins 144, persons of ordinary skill in the art will appreciate that other securing means could be employed in this role without departing from the scope of the invention. By way of example, not limitation, a frictional lock (such as those discussed below) could be employed in this role. Alternatively, the securing means could be implemented as one or more pins which are separable from extension 140 such as the pin 60 discussed above in connection with FIG. 2.

Figure 8:
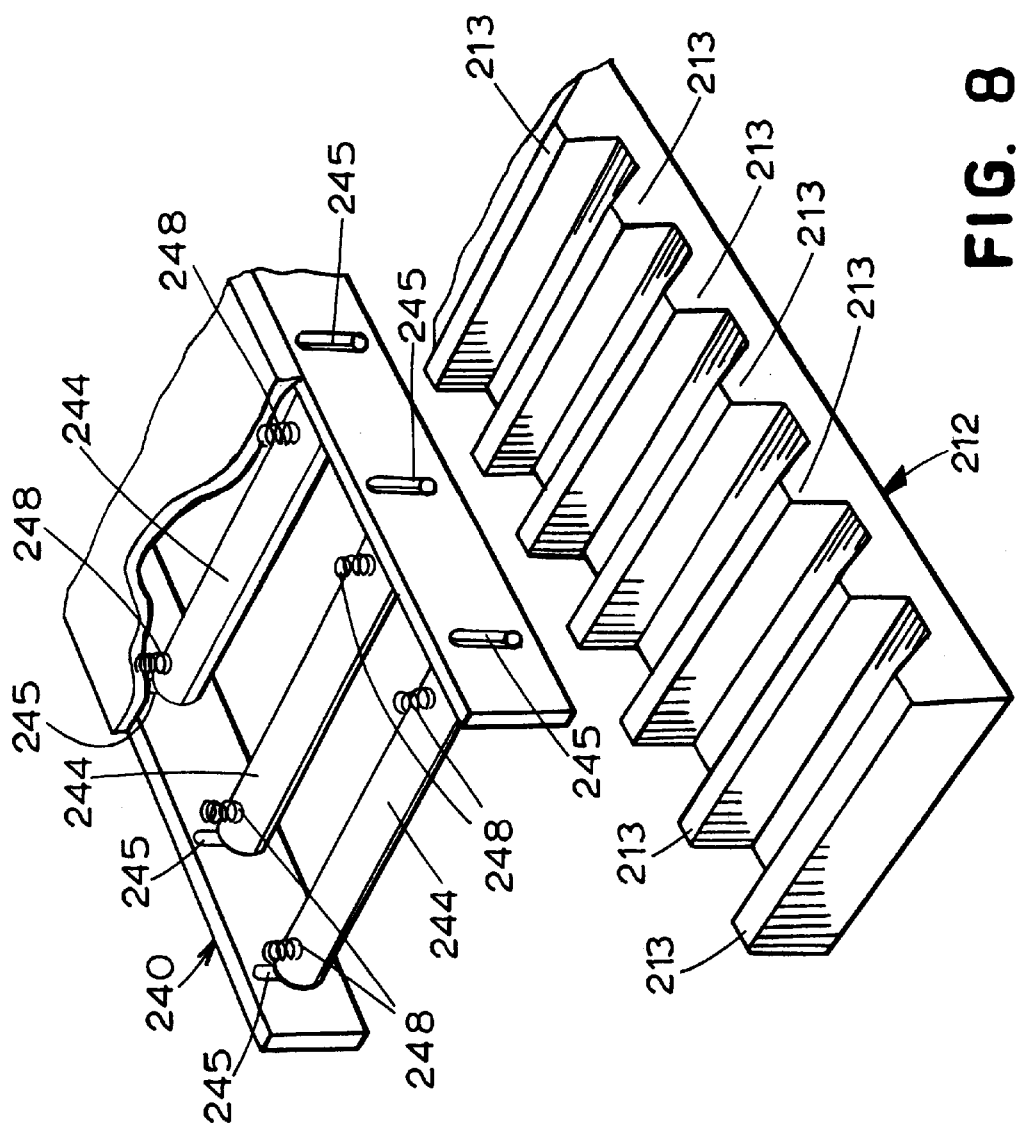
FIG. 8 is a perspective view of an alternative track and locking pin arrangement for the chocking apparatus of FIG. 6.

As still another example, the securing means could equivalently be implemented as a plurality of substantially horizontally oriented pins 244 located in the extension 240 as shown in FIG. 8. If such an approach is taken, although the track would still be secured to the driveway with fasteners or the like, the track 212 would preferably be implemented as a plurality of longitudinally spaced teeth 213 for selectively mating with the horizontal pins 144 of the extension 240.

As with the track 112, the longitudinal spacing of the teeth 213 is preferably different than the longitudinal spacing between the pins 244 to provide a wider range of available chocking positions than would otherwise be available. As shown in FIG. 8, the pins 244 are preferably journalled in substantially vertical slots 245 to permit vertical displacement in the event a pin 244 aligns with a tooth 213 rather than a gap between teeth 213. As also shown in FIG. 8, the pins 244 are preferably biased downward by springs 248 to facilitate location of a gap between teeth 213.

Moreover, although the apparatus 100 of FIGS. 6 and 7 has been illustrated as including one track 112 and one chock 120, persons of ordinary skill in the art will readily appreciate that multiple tracks and or multiple chocks could be utilized without departing from the scope or spirit of the invention.

In addition, although the chock 120 of the apparatus shown in FIGS. 6–7 has been illustrated as implemented by a base, a chocking member and a support plate, persons of ordinary skill in the art will appreciate that the chock 120 could be implemented in other ways without departing from the scope of the invention. For example, the chock 120 could be implemented by a unitary member.

Furthermore, although the extension 140 has been illustrated as secured to the chock 120, the extension and chock need not be fixedly coupled. Moreover, the extension could be integral to the chock. For example, the chock and extension could be implemented as a unitary member without departing from the scope of the invention.

Figure 9:
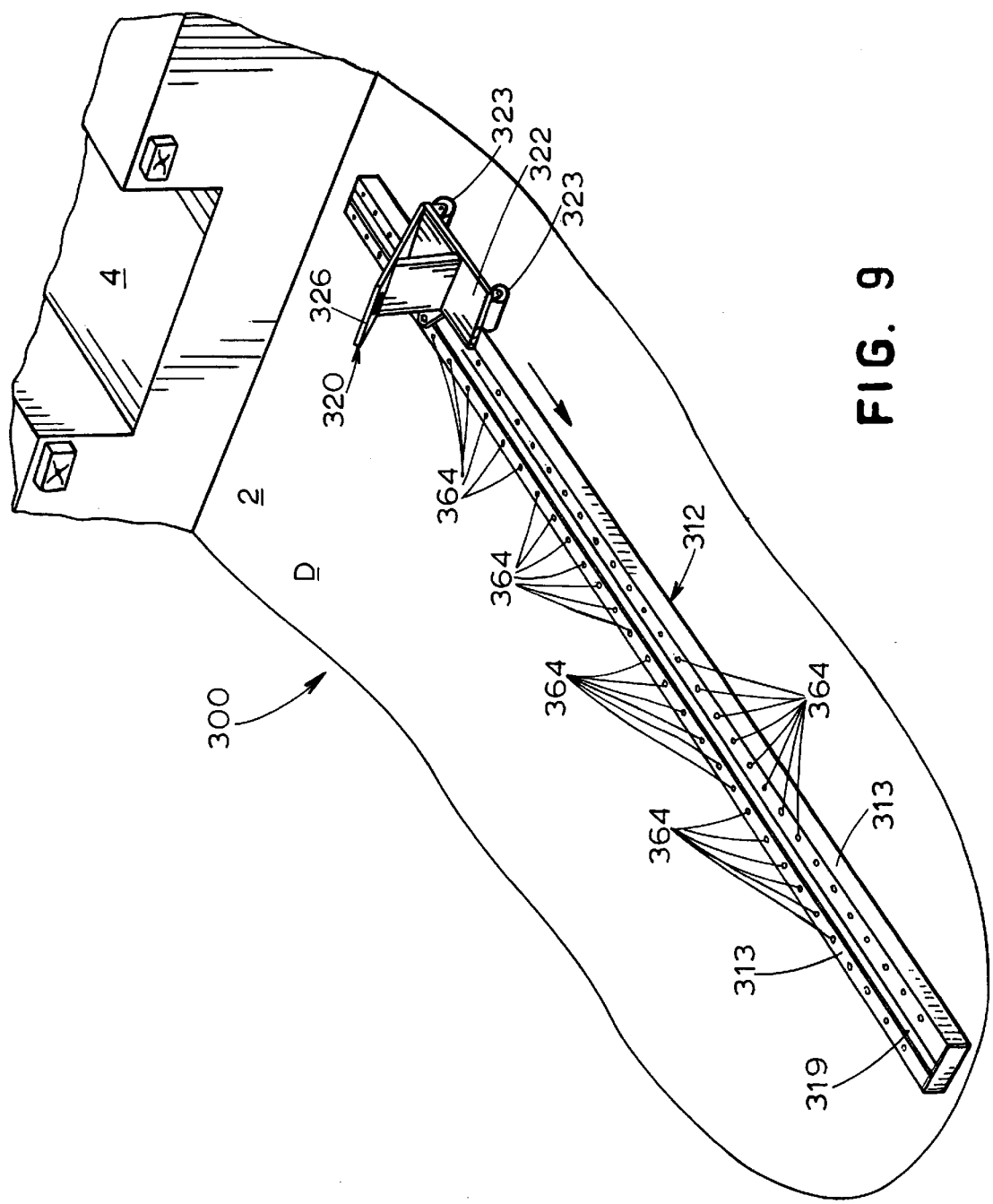
FIG. 9 is a right, front perspective view of another wheel chocking apparatus constructed in accordance with the teachings of the invention.
Figure 10:
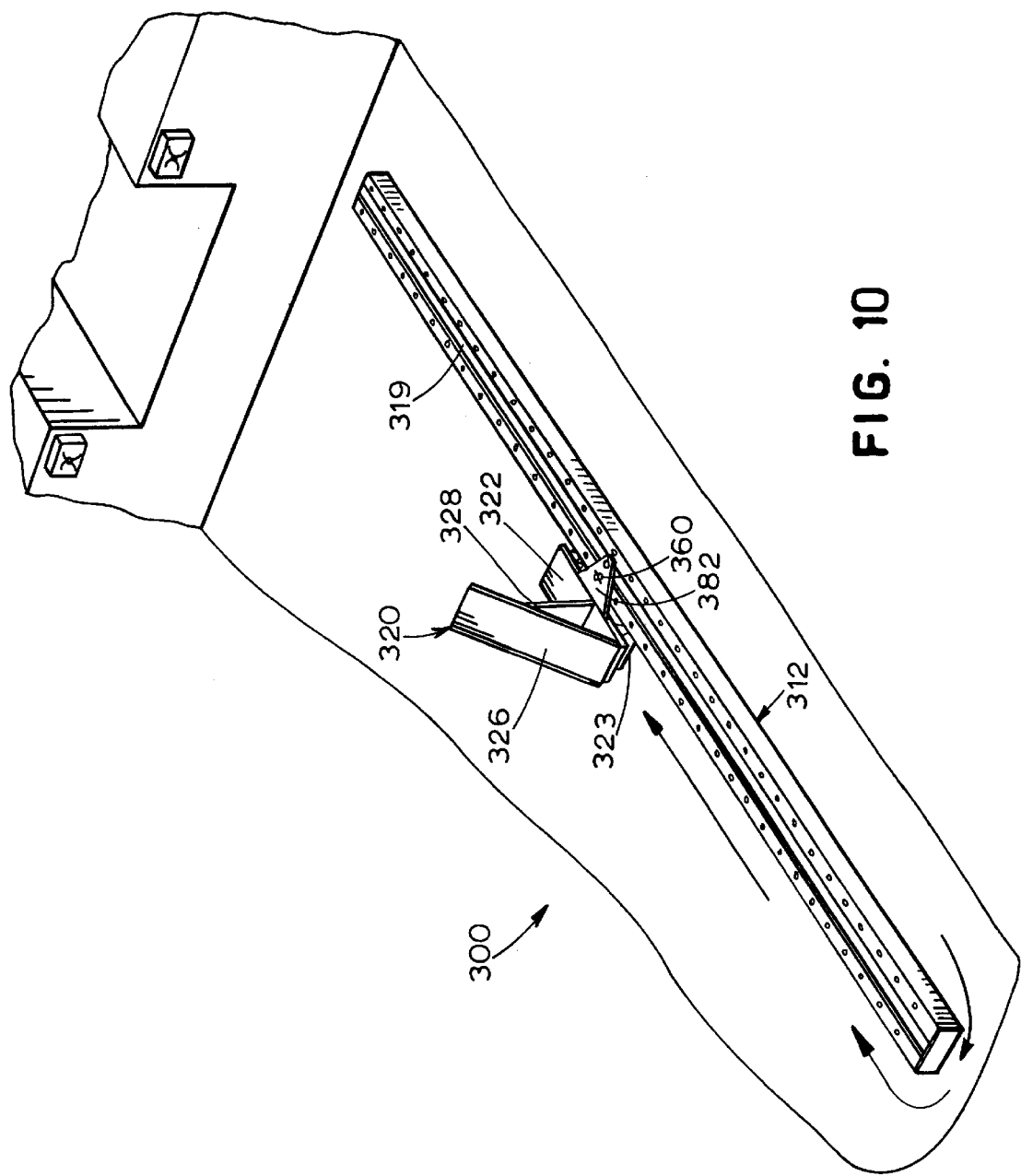
FIG. 10 is a view similar to FIG. 9, but showing the chock rotated to a chocking position.

Another manually positioned wheel chocking apparatus 300 constructed in accordance with the teachings of the invention is shown in FIG. 9. As with the apparatus 10, 100 discussed above, although the chocking apparatus 300 is illustrated for use adjacent a parking area 2 in front of a loading dock 4, the apparatus 300 is not limited to use in any particular environment. Also like the previously described apparatus 10, 100, the wheel chocking apparatus 300 includes a track 312 which is secured adjacent the loading dock illustratively to the driveway adjacent a parking space 2 in front of a loading dock 4 or the like. However, unlike the previously described apparatus 10, 100, the track 312 of the apparatus 300 is preferably implemented by an I-beam 311 and two symmetrical cover plates 313. Preferably the cover plates 313 have an L-shaped cross-section and are spaced from the sides and the top of the I-beam 311 such that the cover plates 313 define a cavity 317 in which the I-beam 311 is disposed. As shown in FIGS. 9 and 10, the cover plates 313 are located such that they define a channel 319 located substantially parallel to the longitudinal axis of the track 312 and substantially above a substantially vertical section 321 of the I-shaped beam 311.

Both the I-beam 311 and the cover plates 313 of the track 312 are secured to the driveway using conventional fasteners (not shown) such as bolts. Preferably, the track 312 is located such that its longitudinal axis is substantially perpendicular to the loading dock 4 and substantially parallel to the parking area 2.

For the purpose of chocking the wheel of a vehicle parked in the parking area, the apparatus 300 is provided with a chock 320. As shown in FIG. 9, the chock 320 includes a base 322 (implemented in the illustrated embodiment as a substantially horizontal platform) and an angled plate or chocking arm 326 welded to and supported upon a substantially vertical support plate 328.

Figure 11:
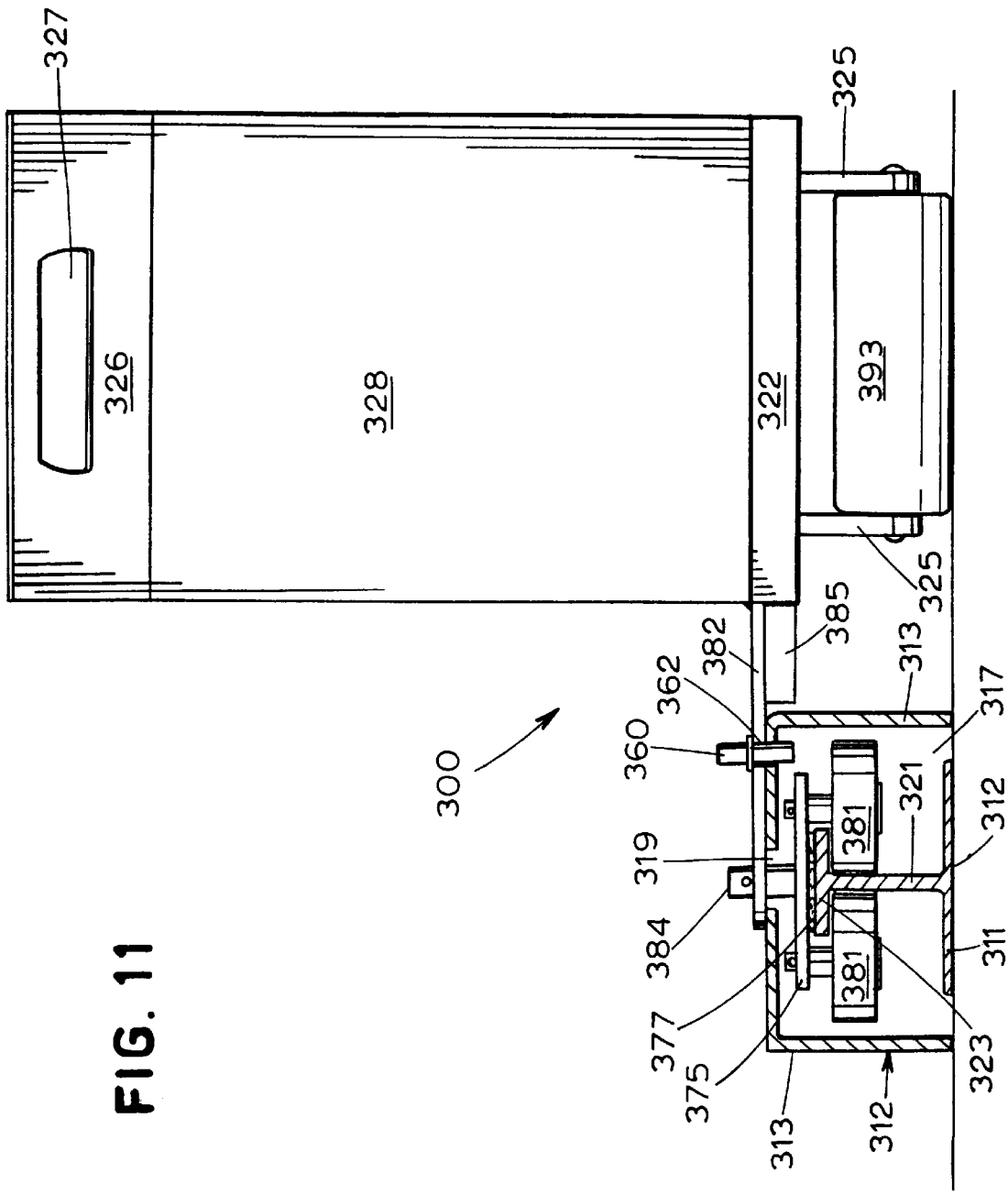
FIG. 11 is a partial cross-sectional view of the chocking apparatus of FIGS. 9 and 10.

In order to couple the chock 320 to the track 312, the apparatus 300 is provided with a trolley 375 located for reciprocating movement along the longitudinal axis of the track 312. As best shown in FIG. 11, the trolley 375 is located within the cavity 317 defined by the cover plates 313. Preferably, the trolley 375 comprises a platform supported in a substantially horizontal plane on a top section 323 of the I-beam 311. To reduce friction between and, thus, wear upon the trolley 375 and the I-beam 311, the apparatus 300 is preferably provided with a spacer 377 disposed between the trolley 375 and top section 323 of the beam 311. Although other materials could be used in this role without departing from the scope of the invention, the spacer 377 is preferably comprised of nylon.

To locate the trolley 375 with respect to the I-beam 311, the trolley 375 is provided with a pair of rollers 381. As shown in FIG. 11, the rollers 381 are suspended from the platform of the trolley 375 and are preferably oriented in a substantially horizontal plane. The rollers 381 preferably engage opposite sides of the vertical section 321 of the I-beam 311.

To couple the chock 320 to the trolley 375, the apparatus 300 is provided with a support arm 382. As most easily seen in FIGS. 10 and 11, the support arm 382 includes a bore which receives a pin 384 mounted on the trolley 375 thereby forming a pivotal engagement therebetween. As shown in FIGS. 10 and 11, the pin 384 is disposed in a substantially vertical position for reciprocating movement within the channel 319. As also shown in FIGS. 10 and 11, the end of the arm 382 opposite the pin 384 is coupled to the base 322 of the chock 320. Therefore, when the chock 320 is moved parallel to the longitudinal axis of the track 312, the trolley 375 slides along the I-beam 311.

To limit pivoting movement of the chock 320 about the pin 384, the chock 320 preferably extends below the height of the L-shaped cover plates 313. Thus, if a pivoting force is applied to the chock 320 when the chock 320 is positioned away from an end of the track 312, contact between the chock 320 and the track 312 limits the amount of pivoting motion of chock 320.

On the other hand, when the chock 320 is moved longitudinally to an end of the track, the chock 320 and the support arm 382 can pivot to thereby switch the chock 320 between the sides of the track 312. By way of example, not limitation, FIG. 9 shows the chock 320 in one possible storage position wherein a vehicle can move into and out of the parking area without interference from the chock 320. FIG. 10, on the other hand, illustrates the chock 320 in one possible chocking position after the chock 320 has been rotated around the distal end of the track 312.

If desired, a spacer 385 can be mounted on the support arm 382 (see FIG. 11) to further limit pivoting movements of the chock 320 when moving the chock 320 longitudinally.

In order to prevent longitudinal movement of the chock 320 when the chock has been positioned in front of a tire to be chocked, the apparatus 300 is provided with means for selectively manually securing the trolley relative to the track 312. In the embodiment illustrated in FIGS. 9–11, the securing means is implemented as a pin 360 (see FIG. 11) sized for simultaneous insertion into a bore 362 defined in the support arm 382 and a bore 364 defined in the cover plates 313. As shown in FIG. 9, the cover plates 313 of the track 312 preferably include a plurality of bores 364 to enable the chock 320 to be fixed in many different positions relative to the track 312 to thereby accommodate different vehicles with different wheel sizes and/or different wheel locations with respect to the dock 4.

In order to reduce stress on the support arm 382, and to facilitate movement of the chock 320, the chock 320 is preferably provided with rollers 393. As shown in FIG. 11, the rollers 393 are preferably journalled in brackets 325 mounted below the base 322 of the chock 320. To further facilitate movement of the chock 320, plate 326 of the chock preferably includes an integral handle 327.

In use, after a vehicle has parked in the parking area 2, a user manually slides the chock distally along the track 312 until the chock 320 can pivot around the distal end of the track. Upon reaching the distal end, the chock 320 is pivoted to the opposite side of the track 312, and then moved proximally along the track until it is located adjacent and distal to a wheel to be chocked. The pin 360 is then inserted into the bore 362 in the support arm 382 and into one of the bores 364 of the track 312. Small longitudinal movements may be necessary to align the bore 362 with one of the bores 364 in the track 312.

When chocking is no longer desired, the pin 360 is removed and the chock 320 is moved around the distal end of the track 312 to a storage position such as that shown in FIG. 9.

Like the above described apparatus 10, 100, the apparatus 300 can be implemented with multiple chocks and/or multiple tracks without departing from the scope of the invention.

Figure 12:
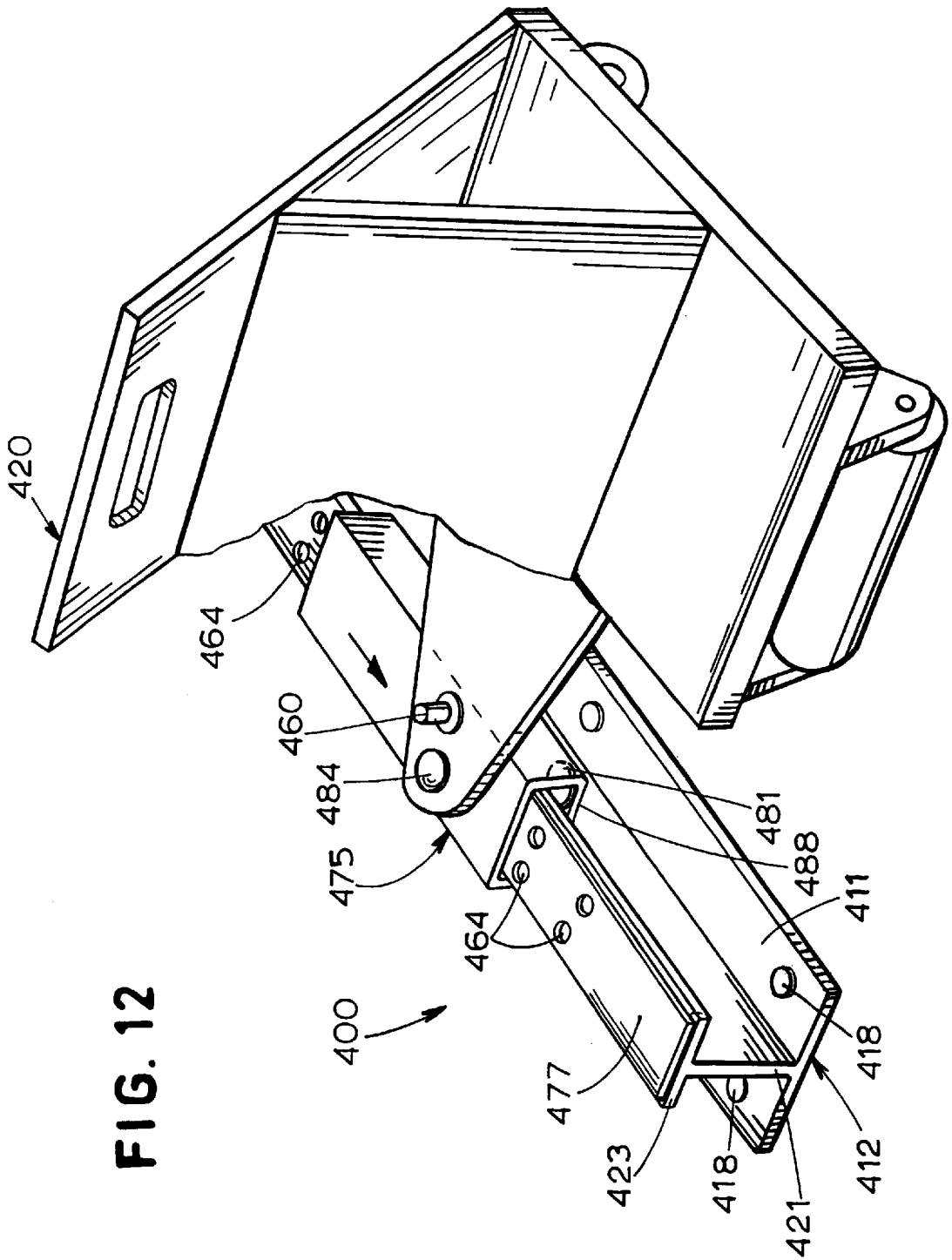
FIG. 12 is a right, front perspective view of another wheel chocking apparatus constructed in accordance with the teachings of the invention.

Another manually positioned wheel chocking apparatus 400 constructed in accordance with the teachings of the invention is shown in FIG. 12. The wheel chocking apparatus 400 is similar in many respects to the apparatus 300 discussed in connection with FIGS. 9–11. In the interest of brevity, the following description will not repeat the discussion of those similar parts. Instead, the interested reader is referred to the above enabling description.

The apparatus 400 differs from the apparatus 300 in that its track 412 comprises only an I-beam 411. It does not include L-shaped cover plates.

As shown in FIG. 12, the apparatus 400 is also different from the apparatus 300 of FIGS. 9–11 in that its trolley 475 comprises a C-shaped rail. The C-shaped rail is mounted for sliding movement along a spacer 477 disposed on a substantially horizontal top section 423 of the I-beam 411. As illustrated in FIG. 12, each of the lower extensions 488 of the C-shaped rail 475 support rollers 481. Preferably, the rollers 481 are located within a cavity defined by the rail 475 for cooperation with the substantially vertical section 421 of the I-beam 411.

As with the apparatus 300, the support arm 482 of the apparatus 400 is pivotally coupled to the trolley 475 via a pin 484 and bore arrangement. Also like the apparatus 300 shown in FIGS. 9–11, the securing means of the apparatus 400 preferably comprises a pin 460. However, pin 460 is sized for simultaneous insertion into a bore defined in the support arm 482, into a bore 464 defined in the I-beam 411, and into a bore (not shown) defined in the trolley 475.

As with the I-beam 311 of the apparatus 300, the I-beam 411 of the apparatus shown in FIG. 12 is preferably fixed to the driveway with conventional fasteners 418 such as bolts. Also like the apparatus 300, the chock 420 of the apparatus 400 can be pivoted around the end of the track 412 to move the chock 420 from a storage position to a chocked position.

Figure 13:
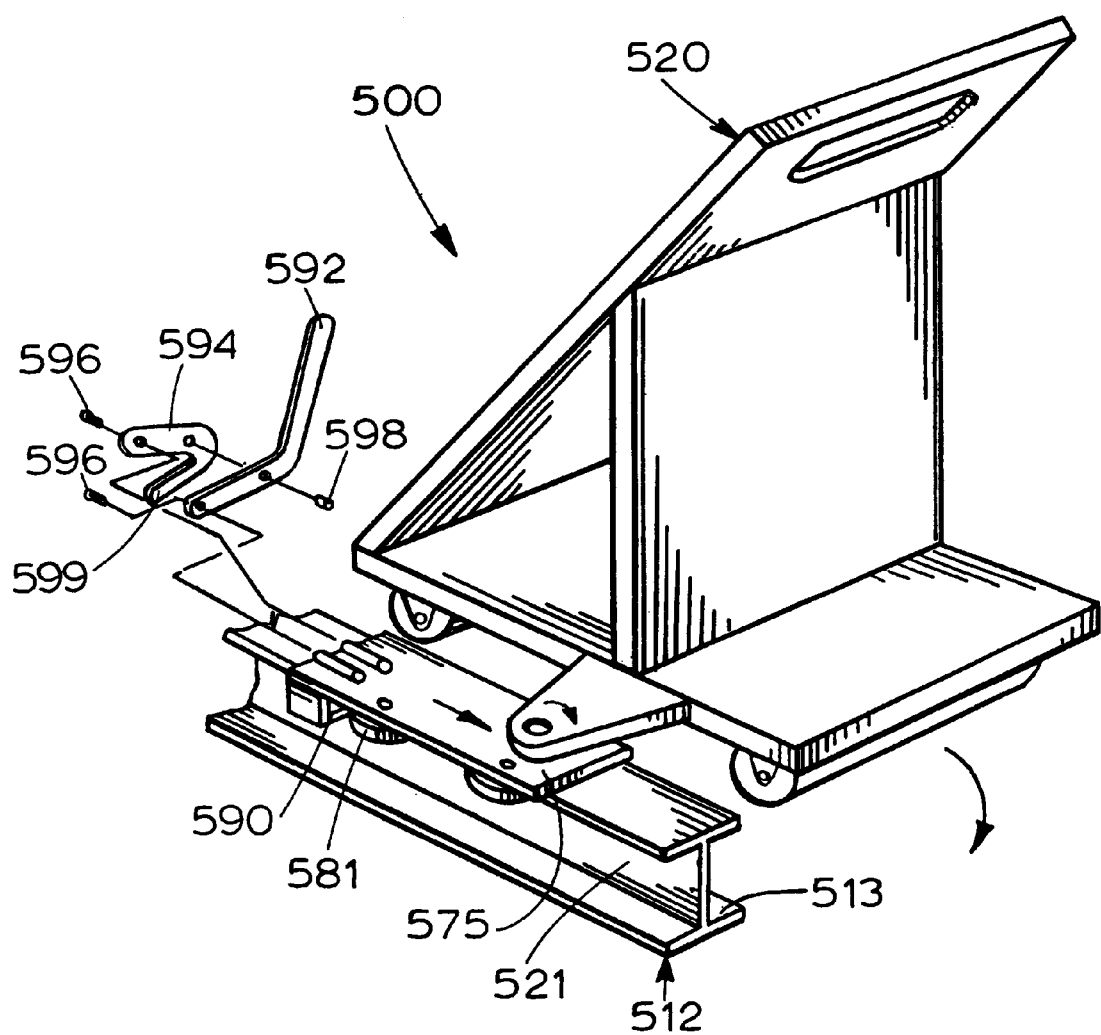
FIG. 13 is a left, front (partially exploded) perspective view of still another chocking apparatus constructed pursuant to the teachings of the invention.
Figure 14:
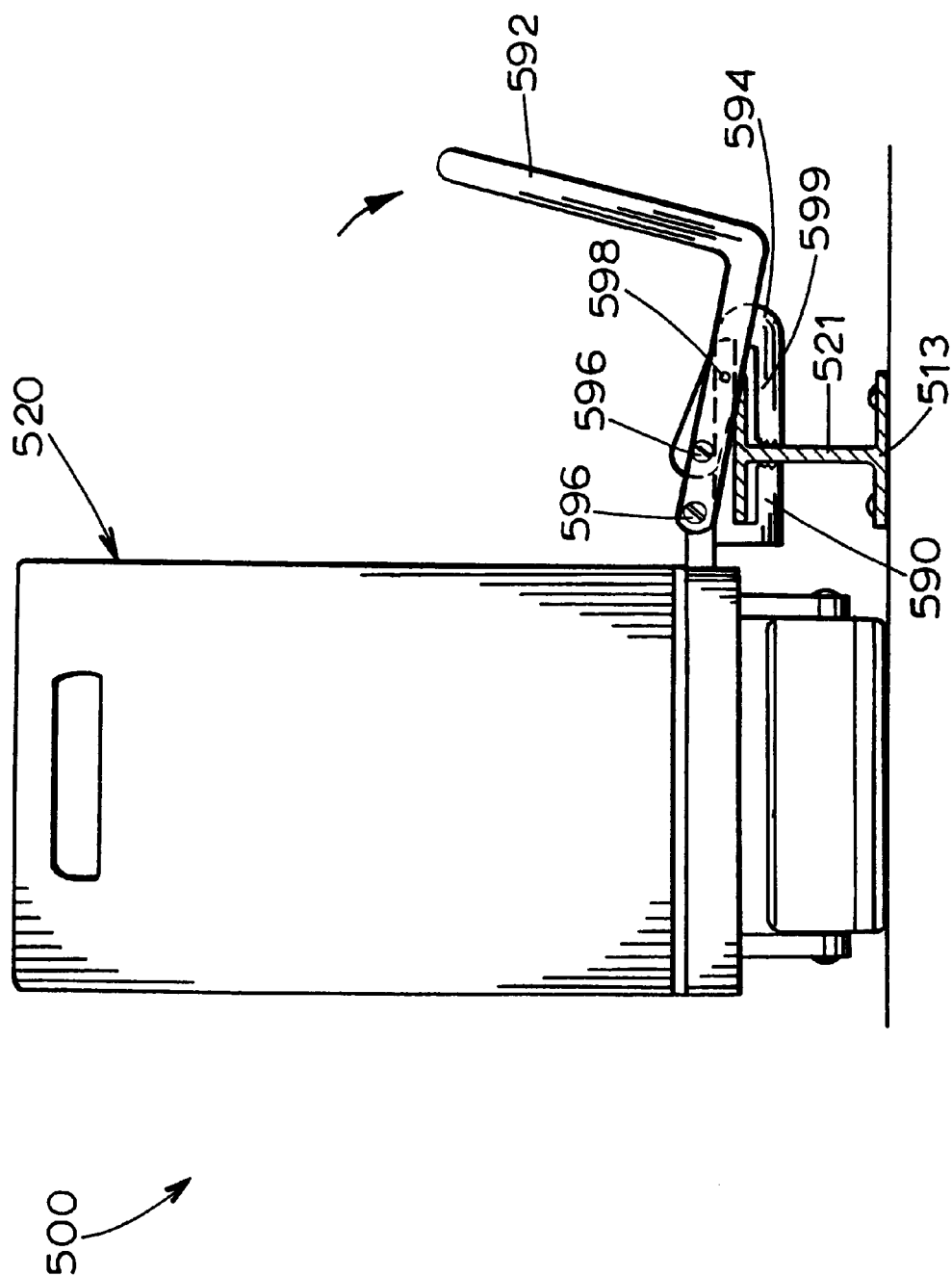
FIG. 14 is a front view of the apparatus of FIG. 13 showing the frictional lock in the locked position.

Another manually positioned wheel chocking apparatus 500 constructed in accordance with the teachings of the invention is shown in FIGS. 13–14. The apparatus 500 is similar to the apparatus 400 in many respects. In the interest of brevity, only those structures which differ from the earlier described structures are described in the following. The interested reader is referred back to the above description for an enabling explanation of parts common to both apparatus 400, 500.

As shown in FIG. 13, the trolley 575 of the apparatus 500 comprises a platform slidably mounted on a substantially horizontal section 523 of the I-beam 513 of the track 512. The trolley 575 is also provided with an L-shaped flange 590 suspended from the platform and arranged to selectively frictionally engage the vertical section 521 of the I-beam as explained below.

To maintain the trolley 575 on the I-beam 513, a plurality of rollers are suspended from the platform of the trolley 575. Some of the rollers 581 engage each side of the substantially vertical section 521 of the I-beam 513 to thereby substantially maintain alignment between the trolley 575 and the I-beam 513 as the trolley 575 moves along the track 512.

The securing means of the apparatus 500 shown in FIGS. 13–14 comprises a frictional lock. More specifically, the apparatus 500 is provided with a toggle lever 592 and a gripping lever 594. Both of these levers 592, 594 are pivotally mounted upon the trolley 575 via fasteners 596. The levers 592, 594 are also pivotally secured to one another via a pin fastener 598 at a point different than the points at which the levers 592, 594 are secured to the trolley 575.

As shown in FIG. 14, an extension 599 of the gripping lever 594 extends beneath the top section of the I-beam 513 for selectively contacting the substantially vertical portion 521 of that beam 513. Thus, by applying a pivoting force to the toggle lever 592, the extension 599 of the gripping lever 594 and the flange 590 can be moved to frictionally engage opposite sides of the center section 521 of the I-beam 513 to thereby prevent longitudinal movement of the chock 520. As shown in FIG. 14, the levers 592, 594 are preferably arranged such that a portion of the gripping lever 594 can be pivoted to below the fastener 596 connecting the lever 594 to the trolley 575 to thereby form an over-center toggle lock.

Figure 15:
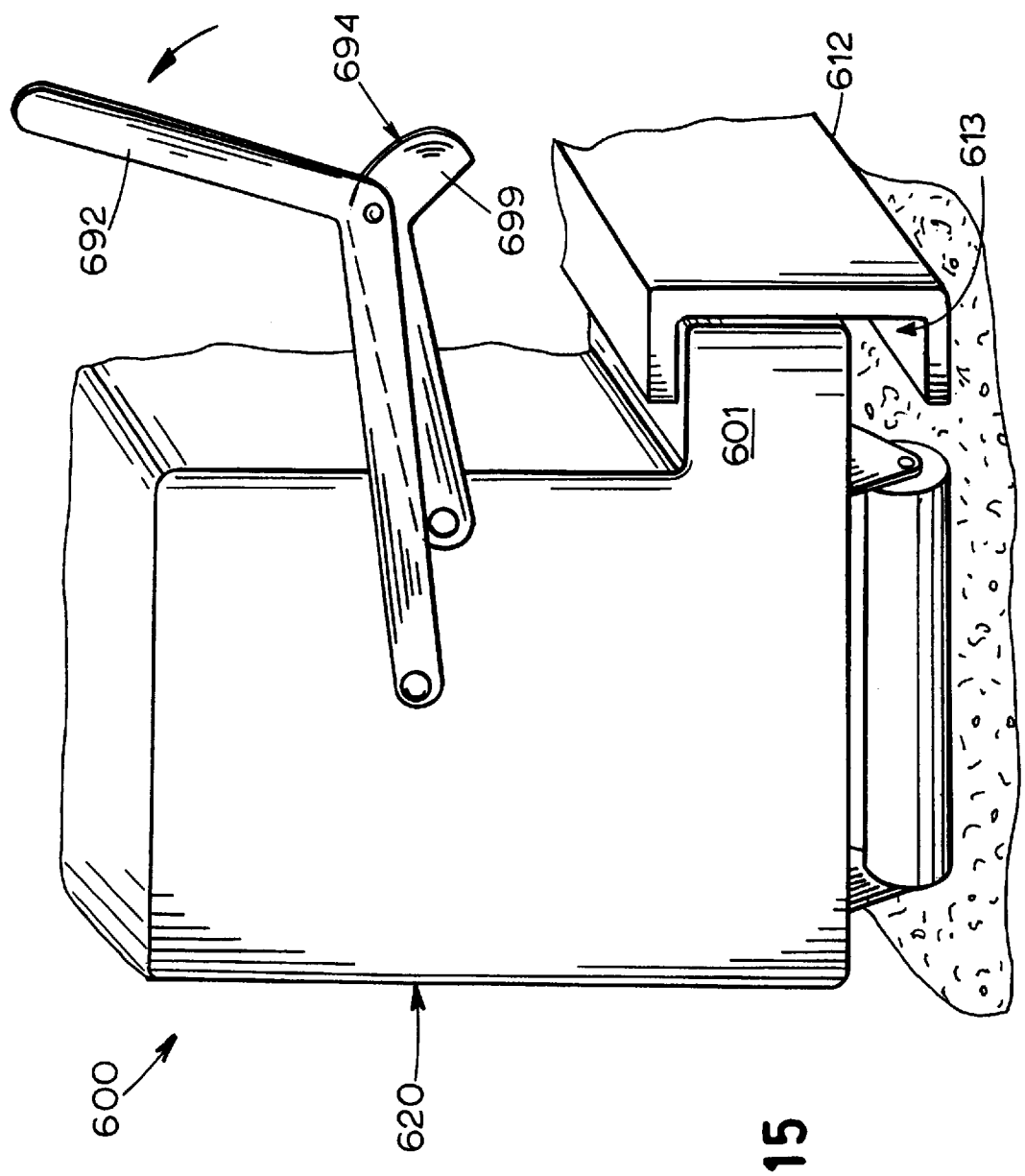
FIG. 15 is a right, front perspective view of yet another chocking apparatus constructed in accordance with the teaching of the invention.
Figure 16:
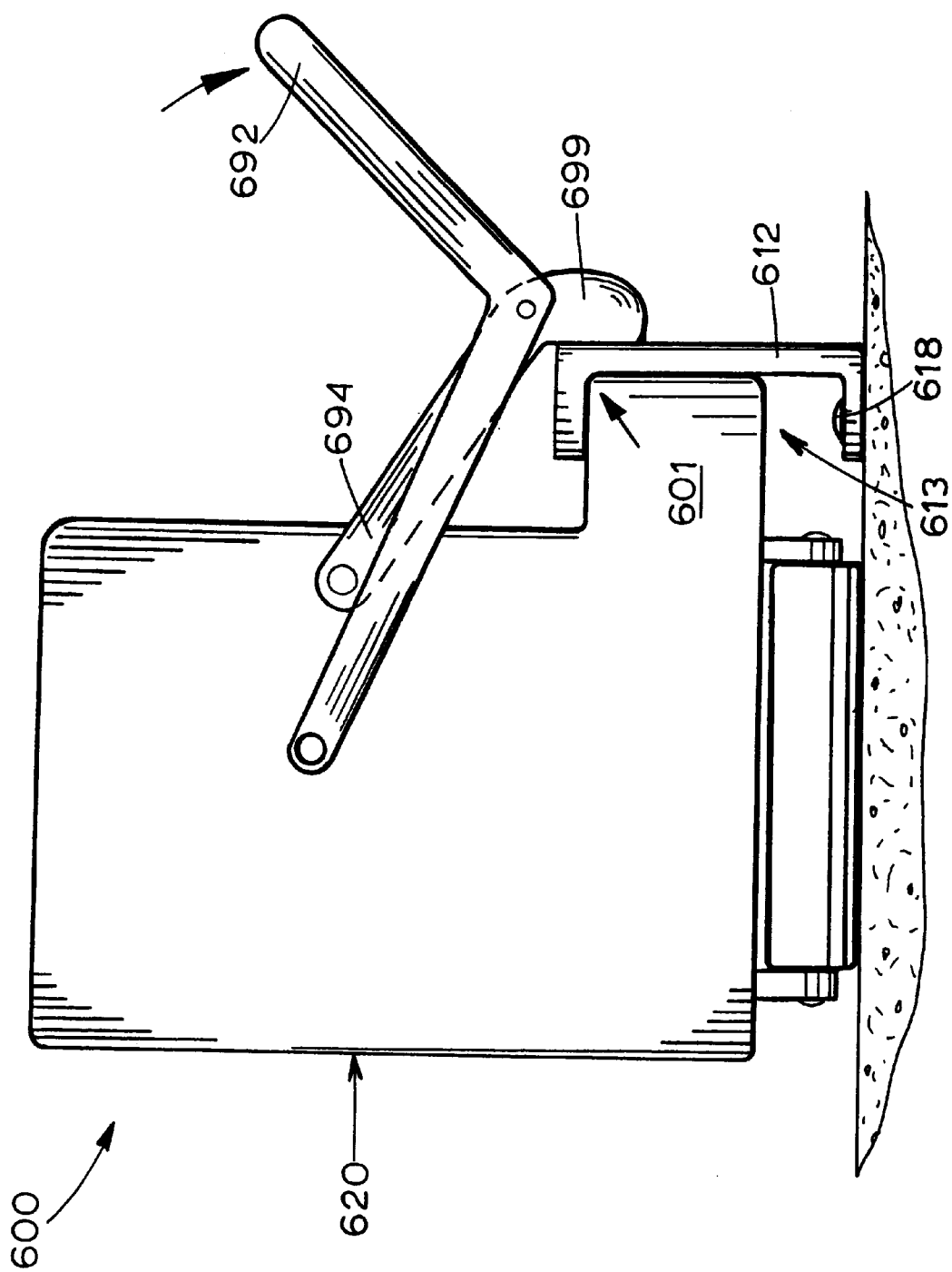
FIG. 16 is a front view of the chocking apparatus of FIG. 15 showing the frictional lock pivoted to the locked position.

Another manually positioned wheel chocking apparatus 600 constructed in accordance with the teachings of the invention is illustrated in FIGS. 15–16. In this embodiment, the track 612 is implemented as a C-shaped bracket defining a recess 613. The track 612 is secured adjacent the loading dock, illustratively to the driveway, via conventional fasteners 618 (see FIG. 16) such that the recess 613 opens towards the parking area.

The chock 620 is similar to the chocks discussed above in that it is movable and it includes a surface for selective positioning within the parking space at a location for engaging a tire of the vehicle. However, the chock 620 is different from the earlier described chocks in that it includes an extension 601 sized for selective positioning at least partially within the recess 613 of the track 612.

Like the apparatus 500 of FIGS. 13–14, the apparatus 600 is provided with a frictional lock implemented as an over-center toggle lock formed by a toggle lever 692 and a gripping lever 694. As shown in FIGS. 15–16, the levers 692, 694 are pivotally coupled to the chock and to each other. As illustrated in FIG. 16, pivoting the lever 692 past the pivot point connecting lever 694 to the chock locks the lever 694 in place until sufficient force is applied to lift it back past the center point.

As also shown in FIG. 16, pivoting the lever 692 has the effect of pulling the extension 601 of the chock 620 into frictional engagement with the track 612. It also forces the extension 699 of the gripping lever 694 into frictional engagement with the track 612 opposite the side engaged by the extension 601. The interaction of the extension 601 of the chock and the projection 699 of the lever 694 with the track 612 secures the extension 601 to substantially prevent the chock 620 from moving relative to the track 612.

Although the connections between the levers 592, 594, 692, 694 have been illustrated in FIGS. 13–16 as implemented by a pin fastener, persons of ordinary skill in the art will appreciate that a spring loaded slot and pin arrangement could also be used in this role to reduce the force needed to lock and/or unlock the frictional lock without departing from the scope or spirit of the invention.

Furthermore, those skilled in the art will further appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

What is claimed is:

1. An apparatus for securing a vehicle in a parking space adjacent a loading dock comprising:

a track secured adjacent the loading dock, the track having first and second sides and a longitudinal axis;

a trolley located for reciprocating movement along the longitudinal axis of the track;

means for selectively securing the trolley relative to the track;

a support arm pivotally attached to the trolley; and, a chock coupled to the support arm such that the support arm can be pivoted to switch the chock from the first side to the second side of the track to position the chock adjacent a tire of the vehicle in the parking space, wherein the chock extends below the track such that the chock can only be pivoted at an end of the track.

2. An apparatus as defined in claim 1 wherein the chock includes a handle to facilitate moving the chock.

3. An apparatus as defined in claim 1 wherein the track is secured to a driveway adjacent the loading dock.

4. An apparatus as defined in claim 1 wherein the track is secured to an upper surface of the driveway.

5. An apparatus as defined in claim 1 wherein the track is secured laterally of the parking space.

6. An apparatus as defined in claim 1 wherein the chock includes a surface for engaging the tire, and the trolley extends laterally of the surface.

7. An apparatus as defined in claim 1 wherein the chock further comprises a roller supporting the chock adjacent the track.

8. An apparatus as defined in claim 1 wherein the securing means comprises a pin adapted for simultaneous insertion into a bore defined in the trolley and a bore defined in the track.

9. An apparatus as defined in claim 8 wherein the pin is separable from the trolley and the track.

10. An apparatus as defined in claim 1 wherein the track comprises an I-beam.

11. An apparatus as defined in claim 10 wherein the trolley further comprises a platform supported on a top section of the I-beam and rollers suspended from the platform in a substantially horizontal plane.

12. An apparatus as defined in claim 11 wherein the rollers comprise at least two rollers, the at least two rollers engaging opposite sides of a substantially vertical section of the I-beam.

13. An apparatus for securing a vehicle in a parking space adjacent a loading dock comprising:

a track secured adjacent the loading dock, the track having first and second sides and a longitudinal axis;

a trolley located for reciprocating movement along the longitudinal axis of the track, the trolley being adapted for selective securement relative to the track;

a support arm pivotally attached to the trolley; and, a chock coupled to the support arm such that the support arm can be pivoted to switch the chock from the first side to the second side of the track to position the chock adjacent a tire of the vehicle in the parking space, wherein the chock extends below the track such that the chock can only be pivoted at an end of the track.

14. An apparatus as defined in claim 13 wherein the chock further comprises a roller supporting the chock adjacent the track.

15. An apparatus as defined in claim 13 wherein the track comprises an I-beam.

16. An apparatus as defined in claim 15 wherein the trolley further comprises a platform supported on a top section of the I-beam and rollers suspended from the platform in a substantially horizontal plane.

17. An apparatus as defined in claim 16 wherein the rollers comprise at least two rollers, the at least two rollers engaging opposite sides of a substantially vertical section of the I-beam.

18. An apparatus as defined in claim 13 wherein the chock includes a handle to facilitate moving the chock.

19. An apparatus for securing a vehicle in a parking space adjacent a loading dock comprising:

a track secured adjacent the loading dock, the track having first and second sides and a longitudinal axis;

a trolley located for reciprocating movement along the longitudinal axis of the track;

means for selectively securing the trolley relative to the track;

a support arm pivotally attached to the trolley;

a chock coupled to the support arm such that the support arm can be pivoted to switch the chock from the first side to the second side of the track to position the chock adjacent a tire of the vehicle in the parking space; and, a roller coupled to the chock to support the chock on a driveway surface adjacent the track to facilitate movement of the chock along the longitudinal axis of the track.

20. An apparatus as defined in claim 19 wherein the track comprises an I-beam.

21. An apparatus as defined in claim 20 wherein the trolley further comprises a platform supported on a top section of the I-beam and rollers suspended from the platform in a substantially horizontal plane.

22. An apparatus as defined in claim 21 wherein the rollers comprise at least two rollers, the at least two rollers engaging opposite sides of a substantially vertical section of the I-beam.

23. An apparatus as defined in claim 19 wherein the chock includes a handle to facilitate moving the chock.

24. An apparatus as defined in claim 19 wherein the securing means comprises a pin adapted for simultaneous insertion into a bore defined in the trolley and a bore defined in the track.

25. An apparatus for securing a vehicle in a parking space adjacent a loading dock comprising:

a track secured adjacent the loading dock, the track having first and second sides and a longitudinal axis;

a trolley located for reciprocating movement along the longitudinal axis of the track, the trolley being adapted for selective securement relative to the track;

a support arm pivotally attached to the trolley;

a chock coupled to the support arm such that the support arm can be pivoted to switch the chock from the first side to the second side of the track to position the chock adjacent a tire of the vehicle in the parking space; and, a roller coupled to the chock to support the chock on a driveway surface adjacent the track to facilitate movement of the chock along the longitudinal axis of the track.

26. An apparatus as defined in claim 25 wherein the track comprises an I-beam.

27. An apparatus as defined in claim 26 wherein the trolley further comprises a platform supported on a top section of the I-beam and rollers suspended from the platform in a substantially horizontal plane.

28. An apparatus as defined in claim 27 wherein the rollers comprise at least two rollers, the at least two rollers engaging opposite sides of a substantially vertical section of the I-beam.

29. An apparatus as defined in claim 25 wherein the chock includes a handle to facilitate moving the chock.

30. An apparatus for securing a vehicle in a parking space adjacent a loading dock comprising:

a track secured adjacent the loading dock, the track including an I-beam and having first and second sides and a longitudinal axis;

a trolley located for reciprocating movement along the longitudinal axis of the track, the trolley including a platform supported on a top section of the I-beam and rollers suspended from the platform in a substantially horizontal plane;

means for selectively securing the trolley relative to the track;

a support arm pivotally attached to the trolley; and, a chock coupled to the support arm such that the support arm can be pivoted to switch the chock from the first side to the second side of the track to position the chock adjacent a tire of the vehicle in the parking space.

31. An apparatus as defined in claim 30 wherein the rollers comprise at lest two rollers, the at least two rollers engaging opposite sides of a substantially vertical section of the I-beam.

32. An apparatus as defined in claim 30 wherein the chock includes a handle to facilitate moving the chock.

33. An apparatus as defined in claim 30 wherein the securing means comprises a pin adapted for simultaneous insertion into a bore defined in the trolley and a bore defined in the track.

34. An apparatus for securing a vehicle in a parking space adjacent a loading dock comprising:

a track secured adjacent the loading dock, the track including an I-beam and having first and second sides and a longitudinal axis;

a trolley located for reciprocating movement along the longitudinal axis of the track, the trolley including a platform supported on a top section of the I-beam and rollers suspended from the platform in a substantially horizontal plane, the trolley being adapted for selective securement relative to the track;

a support arm pivotally attached to the trolley; and, a chock coupled to the support arm such that the support arm can be pivoted to switch the chock from the first side to the second side of the track to position the chock adjacent a tire of the vehicle in the parking space.

35. An apparatus as defined in claim 34 wherein the rollers comprise at least two rollers, the at least two rollers engaging opposite sides of a substantially vertical section of the I-beam.

36. An apparatus as defined in claim 34 wherein the chock includes a handle to facilitate moving the chock.

* * * * *